США006195499B1

(12) United States Patent
Amada et al.

(10) Patent No.: US 6,195,499 B1
(45) Date of Patent: Feb. 27, 2001

(54) MAGNETIC RECORDING AND/OR REPRODUCING APPARATUS

(75) Inventors: Nobutaka Amada; Hiroo Okamoto, both of Yokohama; Hideo Nishijima, Hitachinaka; Hideo Zama, Hitachinaka; Kuniaki Hirayama, Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/399,230

(22) Filed: Sep. 20, 1999

(30) Foreign Application Priority Data

Jul. 9, 1999 (JP) .................................. 11-195408

(51) Int. Cl.[7] ...................................................... H04N 5/93
(52) U.S. Cl. .............................................. 386/68; 386/81
(58) Field of Search ................................. 386/1, 6–8, 23, 386/68, 74, 78–81, 95

(56) References Cited

U.S. PATENT DOCUMENTS 4,954,902 * 9/1990 Furuhata et al. ........................ 386/79
5,825,971 * 10/1998 Inoue et al. ............................ 386/46
6,055,358 * 4/2000 Traxlmayr .............................. 386/96

* cited by examiner

Primary Examiner—Thai Tran
Assistant Examiner—Christopher Onuaku
(74) Attorney, Agent, or Firm—Antonelli, Terry, Stout & Kraus, LLP

(57) ABSTRACT

A magnetic recording and/or reproducing apparatus having a plurality of recording/reproducing modes, such as a long-time recording/reproducing mode and a high rate recording/reproducing mode for digital signals, is intended to form an ideal recording pattern for any head configuration. The apparatus includes magnetic heads 2a and 2b having positive/negative azimuth angles and which are opposed to each other by 180°; magnetic heads 3a and 3b having positive azimuth angles and which are opposed to each other by 180°; and magnetic heads 4a and 4b having negative azimuth angles and which are opposed to each other by 180°; wherein recording/reproducing is performed by using the magnetic heads 2a and 2b in a standard recording/reproducing mode; by using the magnetic heads 3a, 3b, 4a and 4b in a high rate recording/reproducing mode; by using the magnetic heads 2b and 3b in a long-time recording/reproducing mode which is twice as long as the standard mode; and by using the magnetic heads 2a and 2b in a long-time recording/reproducing mode which is N times (N; integer being 3 or more) as long as the standard mode.

26 Claims, 27 Drawing Sheets

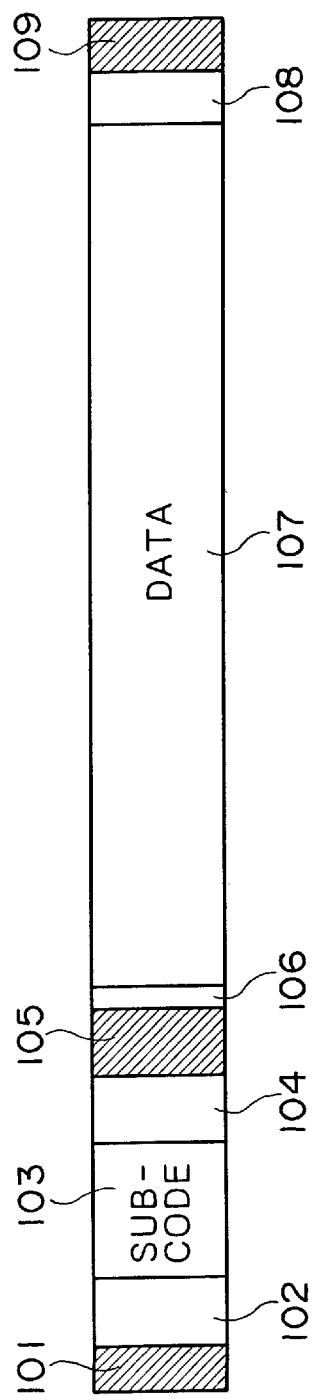
F I G. 2
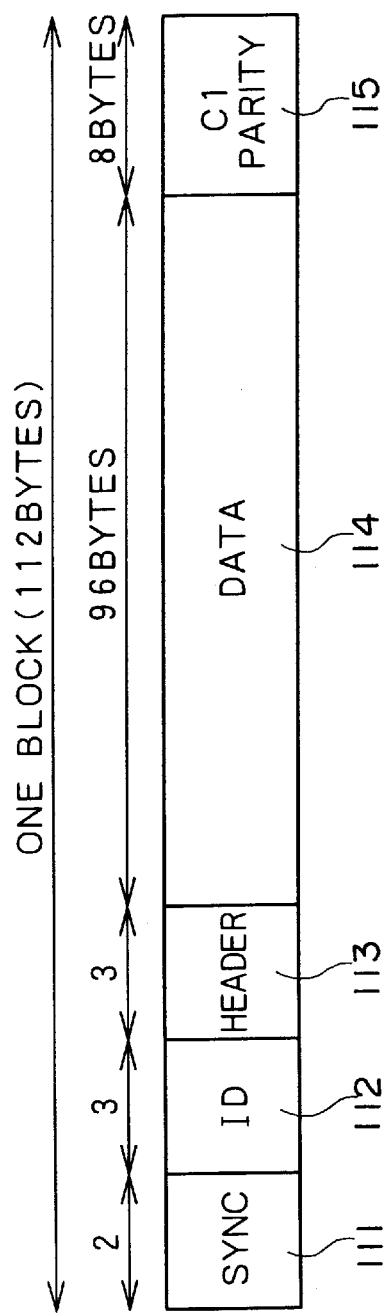
F I G. 3

F I G. 37
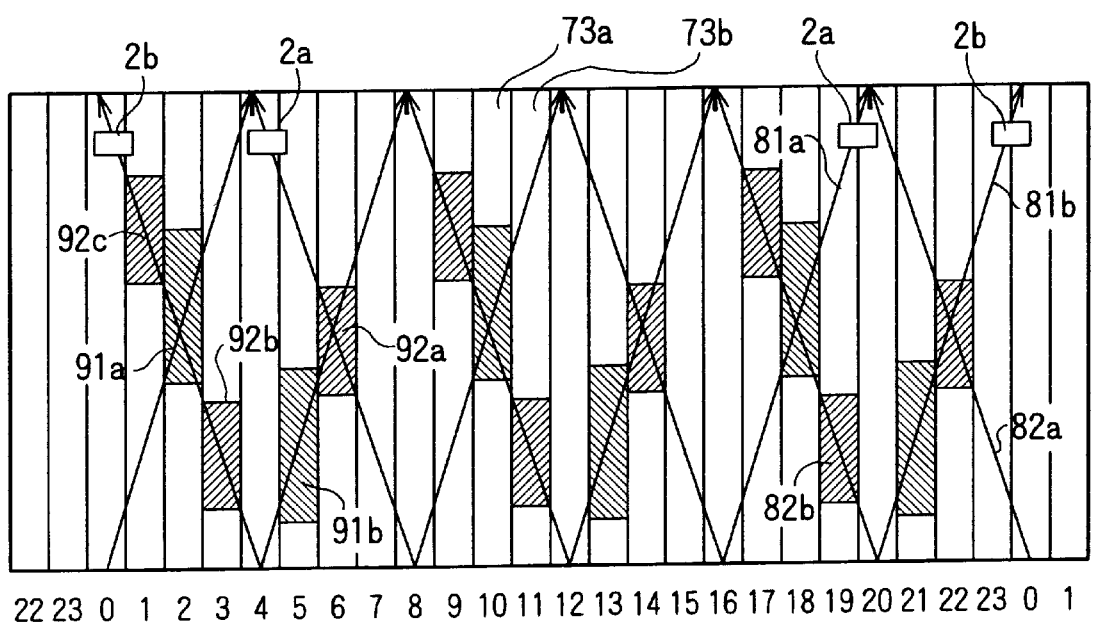

MAGNETIC RECORDING AND/OR REPRODUCING APPARATUS

BACKGROUND OF THE INVENTION

The present invention relates to an apparatus for recording and reproducing digital signals on and from a magnetic tape by using a rotary head; and, MORE particularly, the invention relates to a magnetic recording and/or reproducing apparatus having a plurality of modes matched to transmission rates of digital signals.

The present applicant has proposed, in Japanese Patent Laid-open No. Hei 8-180580, a magnetic recording/reproducing apparatus which is compatable with a conventional analog recording VTR and which also provides a plurality of recording/reproducing modes matched to the transmission rates of digital signals.

This magnetic recording/reproducing apparatus is characterized by recording/reproducing digital signals by using first and second magnetic heads opposed to each other by 180° in a standard recording/reproducing mode; by using the first magnetic head and a third magnetic head disposed in proximity thereto in a long-time recording/reproducing mode which is twice as long as the standard recording/reproducing mode; and by using fourth and fifth magnetic heads opposed to each other by 180° in addition to the second and third magnetic heads in a high rate recording/reproducing mode adapted to high-definition television (HDTV) signals and the like.

SUMMARY OF THE INVENTION

The above-described apparatus proposed by the present applicant, however, has a problem. If the first and second magnetic heads used for the standard recording/reproducing mode are opposed to each other by 180°, the second and third magnetic heads used for the high rate recording/reproducing mode are not accurately opposed to each other by 180°. On the contrary, if the second and third magnetic heads used for the high rate recording/reproducing mode are opposed to each other by 180°, the first and second magnetic heads used for the standard recording/reproducing mode are not accurately opposed to each other by 180°. As a result, there occurs a deviation in the recording pattern in either the standard recording/reproducing mode or the high rate recording/reproducing mode. Such a deviation in recording pattern possibly causes a hindrance to attainment of compatibility with an apparatus having another head configuration.

Further, the above-described apparatus is configured such that the first and third magnetic heads used for the long-time recording/reproducing mode, which is twice as long as the standard recording/reproducing mode, are disposed in proximity to each other, and it fails to consider the case in which the first and third magnetic heads are disposed separately from each other.

An object of the present invention is to solve the above-described problems of the prior apparatus and to provide a magnetic recording and/or reproducing apparatus capable of forming an ideal recording pattern even in the case of adopting any head configuration, thereby attaining compatibility between apparatuses having different head configurations.

To achieve the above object, according to the present invention, there is provided a magnetic recording and/or reproducing apparatus including:

first and second magnetic heads having positive and negative azimuth angles and being opposed to each other by 180°;

third and fourth magnetic heads having positive azimuth angles and being opposed to each other by 180°; and fifth and sixth magnetic heads having negative azimuth angles and being opposed to each other by 180°;

wherein each of three pairs of the first and second magnetic heads, the third and fourth magnetic heads, and the fifth and sixth magnetic heads are mounted substantially at an equal height;

the second and fourth magnetic heads are mounted substantially at a height difference $Hb=(Tp/2)\times(\phi b/180°)$ where $\phi b$ is a difference in mounting angle between the second and fourth magnetic heads and $Tp$ is a track pitch, and the third and fourth magnetic heads are mounted substantially at a height difference $Hc=Tp-(2\times Tp)\times(\phi c/180°)$ where $\phi c$ is a difference in mounting angle between the third and fourth magnetic heads;

whereby recording/reproducing is performed by using the first and second magnetic heads in a standard recording/reproducing mode; by using the third, fourth, fifth and sixth magnetic heads in a high rate recording/reproducing mode; and by using the second and fourth magnetic heads in a long-time recording/reproducing mode which is twice as long as the standard recording/reproducing mode.

BRIEF DESCRIPTION OF THE DRAWINGS

These and other objects, features and advantages of the present invention will become more readily apparent from the following detailed description when taken in conjunction with the accompanying drawings wherein:

FIG. 2 is a diagram showing one example of the content of digital signals recorded on one track;

FIG. 3 is a diagram showing one example of a block configuration of a data recording region;

FIG. 37 is a diagram showing a further example of the relationship between data, used for trick playing-back, recorded on the magnetic tape and traces of magnetic heads;

DETAILED DESCRIPTION OF THE INVENTION

Hereinafter, embodiments of the present invention will be described with reference to the drawings.

Figure 1:
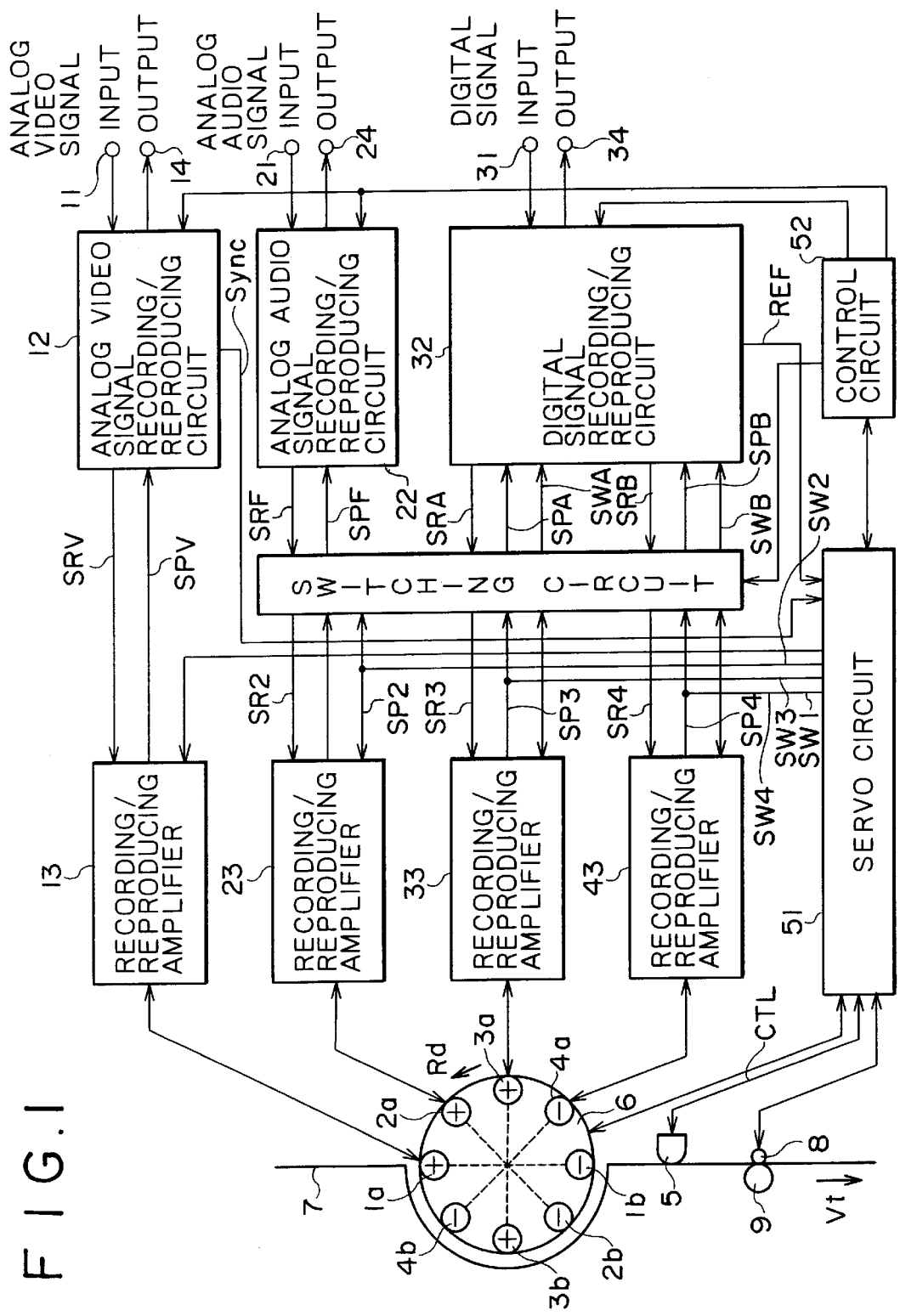
FIG. 1 is a block diagram showing one embodiment of a magnetic recording/reproducing apparatus according to the present invention.

FIG. 1 is a block diagram showing a magnetic recording/reproducing apparatus according to the present invention. It should be noted that the present invention is applied not only to the apparatus shown in FIG. 1, which is used for both recording and reproducing signals, but also to a system including a recording apparatus and a reproducing apparatus which are independent from each other. Referring to FIG. 1, reference characters 1a and 1b designate analog video signal recording/reproducing magnetic heads; 2a and 2b are analog audio signal and digital signal recording/reproducing magnetic heads; 3a, 3b, 4a and 4b are magnetic heads specialized for recording/reproducing digital signals; 5 is a magnetic head for recording/reproducing tracking control pulses; 6 is a rotating drum; 7 is a magnetic tape; 8 is a capstan for controlling traveling movement of the magnetic tape 7; 9 is a pinch roller; 13 is a recording/reproducing amplifier used for amplifying recording/reproducing signals for the magnetic heads 1a and 1b; 23 is a recording/reproducing amplifier used for amplifying recording/reproducing signals for the magnetic heads 2a and 2b; 33 is a recording/reproducing amplifier used for amplifying recording/reproducing signals for the magnetic heads 3a and 3b; 43 is a recording/reproducing amplifier used for amplifying recording/reproducing signals the magnetic heads 4a and 4b; 12 is an analog video signal recording/reproducing circuit for recording/reproducing analog video signals; 22 is an analog audio signal recording/reproducing circuit for recording/reproducing analog audio signals; 32 is a digital signal recording/reproducing circuit for recording/reproducing digital signals; 51 is a servo circuit for controlling the rotating drum 6 and the capstan 8; 52 is a control circuit for controlling an operational mode and the like of the recording/reproducing apparatus; and 60 is a switching circuit for switching recording/reproducing signals.

First, the operation of the apparatus in the case of recording/reproducing analog signals in an ordinary mode will be described below.

Upon recording analog signals, an analog video signal inputted to an input terminal 11 and an analog audio signal inputted to an input terminal 21 are converted into recording signals SRV and SRF by the analog video signal recording/reproducing circuit 12 and the analog audio signal recording/reproducing circuit 22, respectively. The analog video signal is amplified to a specific level by the recording/reproducing amplifier 13 and is recorded on the magnetic tape 7 by the magnetic heads 1a and 1b. The analog audio signal is inputted in the recording/reproducing amplifier 23 via the switching circuit 60, being amplified to a specific level thereat, and is recorded on the magnetic tape 7 by the magnetic heads 2a and 2b. At this time, the servo circuit 51 controls the speed of rotation of the rotating drum 6 in such a manner that the rotation of the rotating drum 6 is synchronized with a vertical synchronization signal Sync of the video signal outputted from the analog video signal recording/reproducing circuit 12. A tracking control pulse CTL is recorded on the magnetic tape 7 with a specific timing of one time per one revolution of the rotating drum 6 by the magnetic head 5.

Upon reproducing analog signals, the servo circuit 51 controls the capstan 8 in such a manner that tracking is optimized on the basis of the level of the tracking control pulse CTL or a reproducing signal SPV or SPF. An analog video signal reproduced by the magnetic heads 1a and 1b and an analog audio signal reproduced by the magnetic heads 2a and 2b are amplified by the recording/reproducing amplifiers 13 and 23, are inputted to the analog video signal recording/reproducing circuit 12 and the analog video signal recording/reproducing circuit 22 so as to be subjected to specific processing thereat, and are outputted from output terminals 14 and 24, respectively.

In a long-time analog signal recording/reproducing mode, analog signals are recorded/reproduced in the same manner as that in the ordinary mode except for the fact that the traveling speed of the magnetic tape 7 becomes slower, that is, the track pitch becomes narrower. In addition, the traveling speed of the magnetic tape 7 in the long-time recording/reproducing mode is set to a value which is, for example, one-third that in the ordinary mode. A video signal is recorded/reproduced by using magnetic heads (not shown) specialized for the long-time recording/reproducing mode, which are disposed in proximity to the magnetic heads 1a and 1b, respectively. The track pitch upon recording/reproducing analog signals in the ordinary mode is set to, for example, 58 μm, and the azimuth angles of the magnetic heads 1a and 1b are set to, for example, ±6°, and the azimuth angles of the magnetic heads 2a and 2b are set to, for example, ±30°.

Hereinafter, the operation of the apparatus in the case of recording/reproducing digital signals according to the present invention will be described.

First, the operation in a standard digital signal recording/reproducing mode (hereinafter, referred to as a "STD mode") will be described.

Upon recording digital signals, a digital signal inputted from an input terminal 31 is converted into a recording signal SRA of a specific form by the digital signal recording/reproducing circuit 32. The recording signal SRA is inputted in the recording/reproducing amplifier 23 via the switching circuit 60 where it is amplified to a specific level, and is recorded on the magnetic tape 7 by the magnetic heads 2a and 2b. At this time, the servo circuit 51 controls the rotation of the rotating drum 6 in such a manner that the rotation of the rotating drum 6 is synchronized with a reference signal REF outputted from the digital signal recording/reproducing circuit 32. A tracking control pulse CTL is also recorded on the magnetic tape 7 with a specific timing of one time per one revolution of the rotating drum 6 by the magnetic head 5.

The rotation speed of the rotating drum 6 is set to, for example, 30 rps which is the same as that for recording analog signals, and the traveling speed of the magnetic tape 7 is set to, for example, one-half that for recording analog signals in the ordinary mode.

Upon reproducing digital signals, just as in reproducing analog signals, the servo circuit 51 controls the capstan 8 in such a manner that tracking is optimized on the basis of the level of the tracking control pulse CTL or a reproducing signal SPA. A digital signal reproduced by the magnetic heads 2a and 2b is amplified by the recording/reproducing amplifier 23, is inputted the digital signal recording/reproducing circuit 32 via the switching circuit 60 where it is subjected to specific processing, such as error correction processing, and is outputted from an output terminal 34.

In the configuration shown in FIG. 1, the common magnetic heads 2a and 2b are used for recording/reproducing analog audio signals and for recording/reproducing digital signals, however, magnetic heads provided separately from the magnetic heads 2a and 2b may be used either for recording/reproducing analog audio signals or for recording/reproducing digital signals. In the case of using separate magnetic heads, the azimuth angles of the magnetic heads may be set to ±30°.

FIG. 2 is a diagram showing an example of the content of digital signals recorded on one track. In this figure, reference numeral 103 designates a sub-code recording region for recording a sub-code, such as time information or program information; 107 is a data recording region for recording digital signals; 102 and 106 are preambles of the recording regions 103 and 107; 104 and 108 are postambles of the recording regions 103 and 107; 105 is a gap between the recording regions 103 and 107; and 101 and 109 are margins at the track ends.

FIG. 3 is a diagram showing an example of a block configuration of the data recording region 107. In this figure, reference numeral 111 designates a synchronization signal; 112 is ID information such as a block address; 113 is a header; 114 is data; and 115 is a parity (C1 parity) used for first error detection/correction. The number of bytes of the data recording region 107 is set, for example, as follows: 2 bytes for the synchronization signal 111; 3 bytes for the ID information 112; 3 bytes for the header 113; 96 bytes for the data 114; and 8 bytes for the C1 parity 115. As a result, the total number of bytes of one block becomes 112 bytes.

Figure 4:
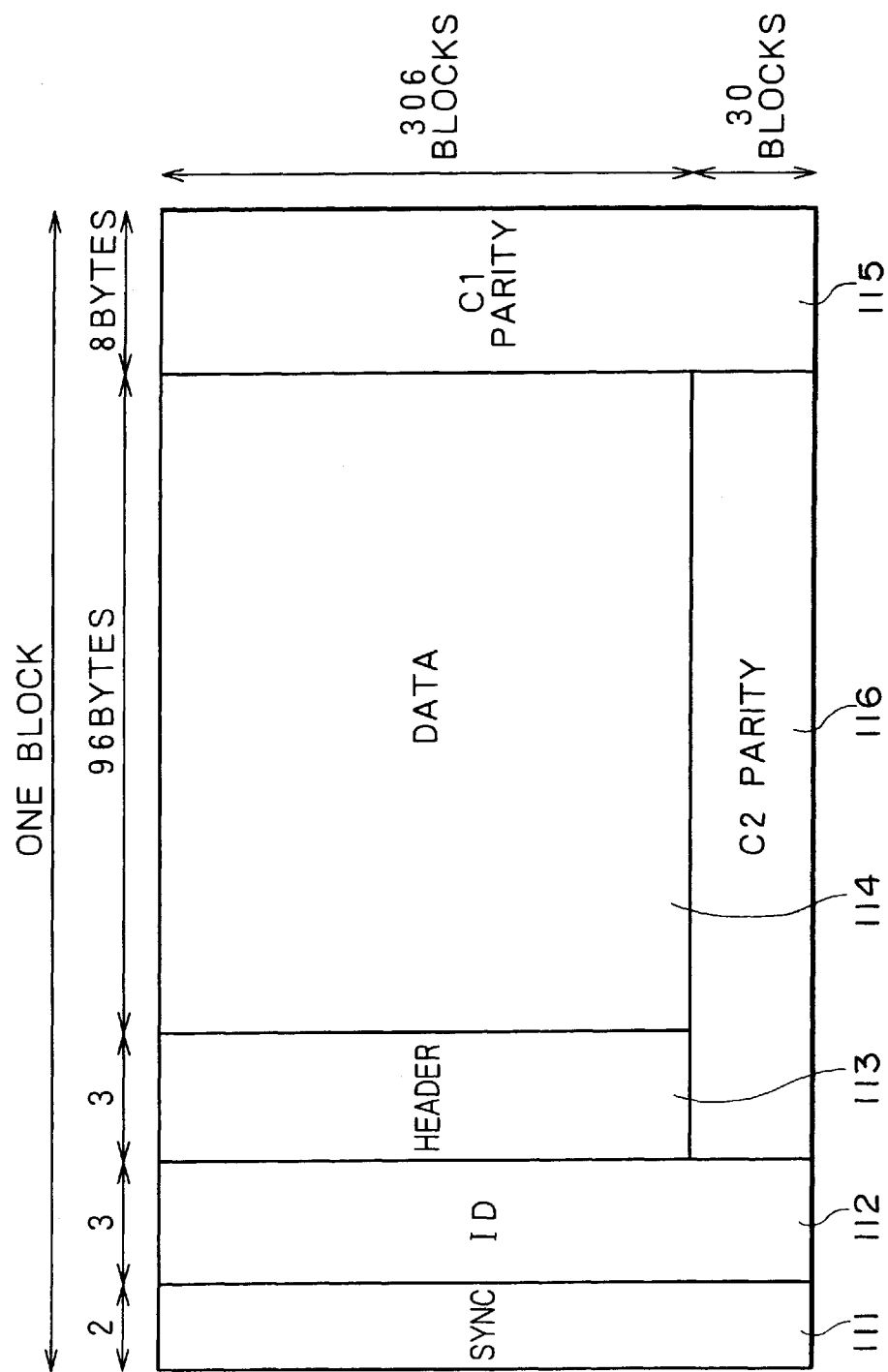
FIG. 4 is a diagram showing one example of a data configuration for one track in the data recording region.

FIG. 4 is a diagram showing an example of a data configuration for one track in the data recording region 107. The data recording region 107 has, for example, 336 blocks. The data 114 are recorded in the initial 306 blocks and a second error correction code (C2 parity) 116 is recorded in the next 30 blocks. The C2 parity 116 is recorded, for example, in six tracks as a unit. To be more specific, data for 306 blocks X6 tracks are divided by 18, and the C2 parity for 10 blocks are added to the data for 102 blocks. A Reed-Solomon code may be used as the error correction code.

Figure 5:
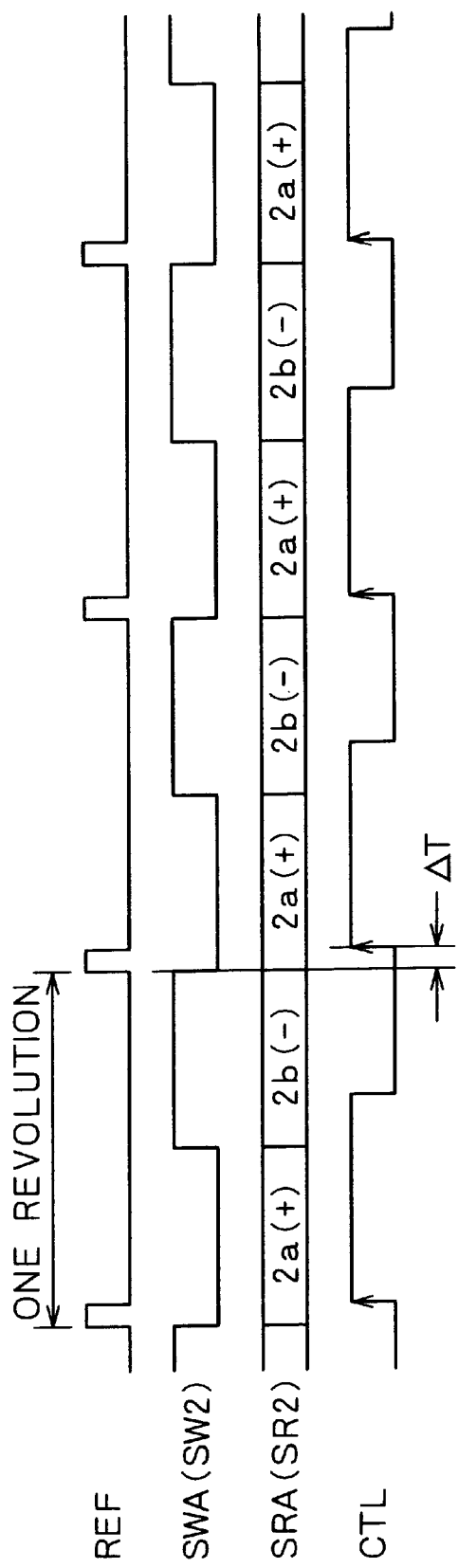
FIG. 5 is a timing chart which relates to the recording of a digital signal in a standard mode.

FIG. 5 is a timing chart which relates to the recording of digital signals. First, the reference signal REF is outputted from the digital signal recording/reproducing circuit 32 to the servo circuit 51. The servo circuit 51 controls the rotation of the rotating drum 6 on the basis of the reference signal REF, and also outputs a head switching signal SWA to the digital signal recording/reproducing circuit 32 in order that the recording signal SRA is recorded on the magnetic tape 7 at a specific position. The recording signal SRA is outputted from the digital signal recording/reproducing circuit 32 on the basis of the head switching signal SWA. In the timing chart shown in FIG. 5, the reference signal REF is outputted at the beginning of the +azimuth track; however, it may be outputted at another position. The reference signal REF need not necessarily be outputted one time per one revolution, but may be outputted, for example, one time per one track. The servo circuit 51 outputs the tracking control pulse CTL to the magnetic head 5 with a specific timing, one time per one revolution of the rotating drum 6, to record the tracking control pulse CTL on the magnetic tape 7. In addition, an arrow ↑ in FIG. 5 designates a rising edge of the tracking control pulse CTL.

Figure 6:
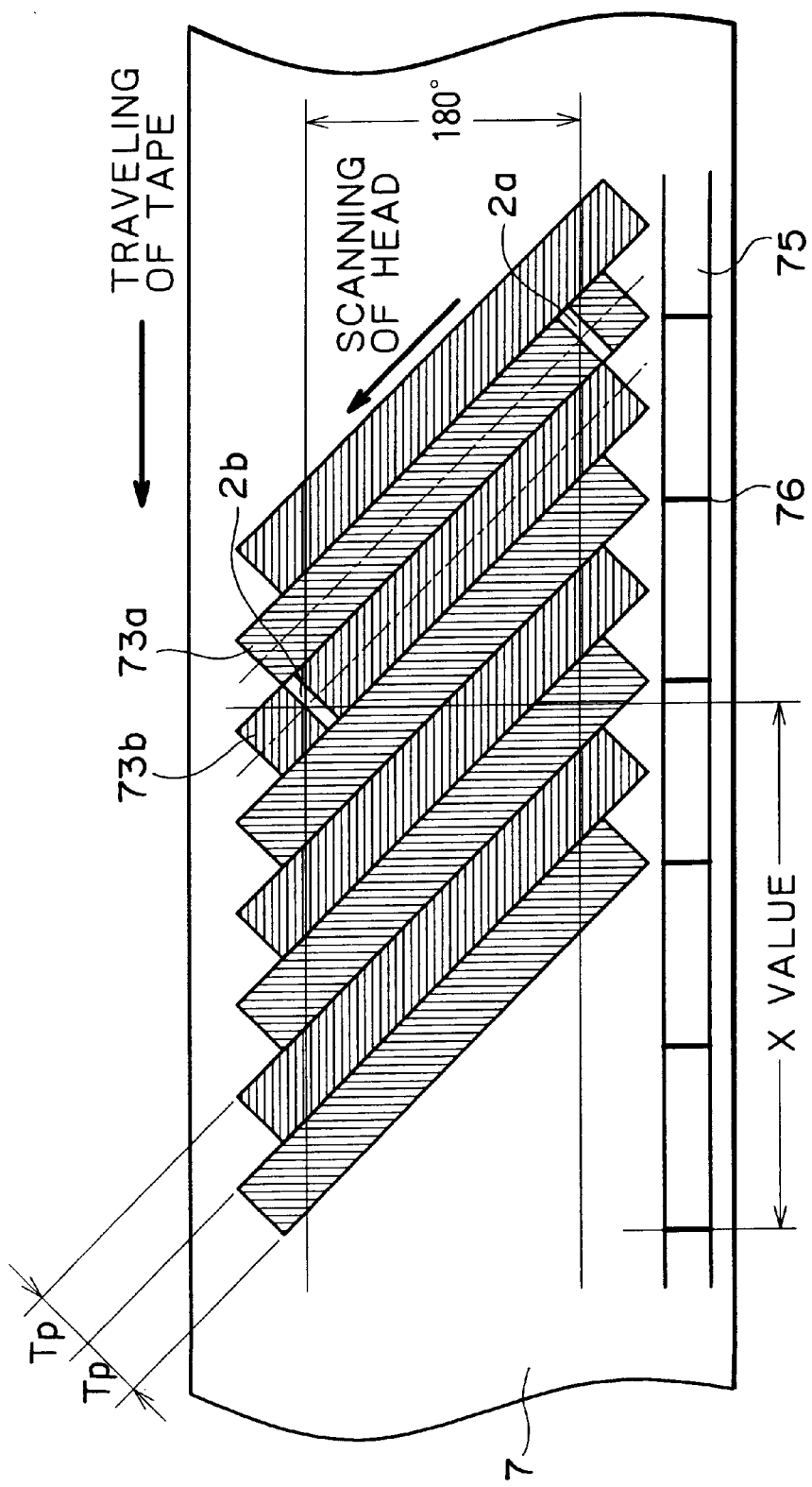
FIG. 6 is a diagram of the pattern of a recording track on a magnetic tape in the standard mode.

FIG. 6 is a diagram showing a pattern of the recording track on the magnetic tape 7 during recording of the digital signals. In this figure, reference character 73a designates a plus (+) azimuth track; 73b is a minus (−) azimuth track; 75 is a recording track of the tracking control pulses CTL; and 76 is a rising edge (equivalent to the portion shown by the arrow ↑) of the tracking control pulse CTL. In addition, the track pitch Tp is, for example, 29 μm.

The feature of the present invention lies in the recording timing of the tracking control pulse CTL. To be more specific, as shown in FIG. 5, the recording timing of the rising edge (shown by the arrow t) of the tracking control pulse CTL is set to a time point delayed by a specific time (ΔT), for example, about 0.6 ms, after termination of the recording by the minus (−) azimuth magnetic head 2b, and further the recording timing is made identical not only to that in the STD mode, but also to those in other recording/ reproducing modes to be described later. With this configuration, the physical position of the rising edge of the tracking control pulse CTL with respect to the digital signal recording track on the magnetic tape 7, for example, a distance shown by an X value in FIG. 6, is uniquely determined irrespective of both the head arrangement and the recording/reproducing mode. As a result, there can be obtained an effect of attaining compatibility upon reproducing digital signals with an apparatus having a different head configuration.

The recording timing of the tracking control pulse CTL will be described in detail below.

Figure 7:
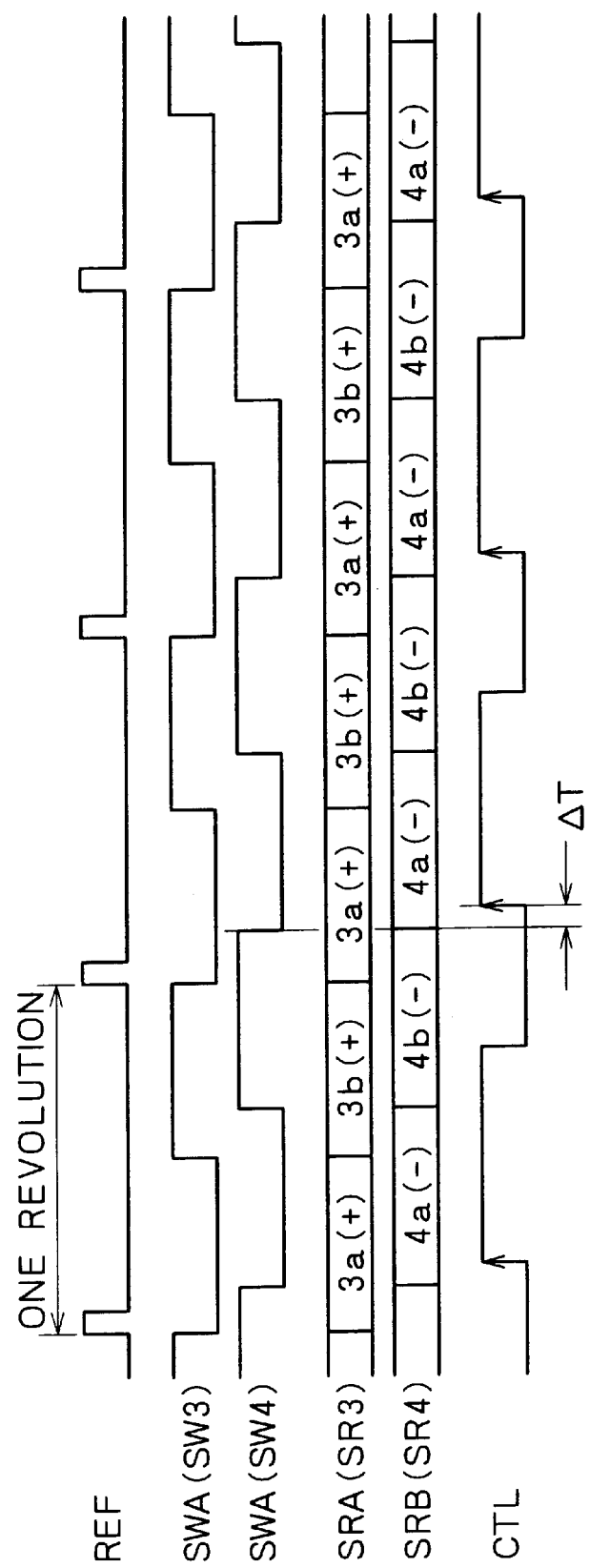
FIG. 7 is a timing chart which relates to the recording of a digital signal in a high rate mode.

FIG. 7 is a timing chart which relates to the recording of digital signals in a high rate recording/reproducing mode (hereinafter, referred to as a "HS mode") matched to a high-definition television (HDTV) signal. In the HS mode, the number of revolutions of the rotating drum 6 is identical to that in the above-described STD mode, but the traveling speed of the magnetic tape 7 is set to be twice as fast as that in the STD mode, and digital signals are recorded in two channels by using the magnetic heads 3a, 3b, 4a and 4b. With this configuration, the rate of digital signals to be recorded can be made twice as large as that in the STD mode, while the track pith Tp and the recording frequency can be made identical to those in the STD mode.

In FIG. 7, the reference signal REF is the same as that in the STD mode in FIG. 5. The servo circuit 51 controls the rotation of the rotating drum 6 on the basis of the reference signal REF, and outputs head switching signals SWA and SWB to the digital signal recording/reproducing circuit 32. The digital signal recording/reproducing circuit 32 outputs recording signals SRA and SRB on the basis of the head switching signals SWA and SWB. The recording signal SRA is inputted in the recording/reproducing amplifier 33 via a switching circuit 53, where it is amplified to a specific level, and is then recorded on the magnetic tape 7 by the magnetic heads 3a and 3b. Similarly, the recording signals SRB is inputted in the recording/reproducing amplifier 43 via the switching circuit 53, where it is amplified to a specific level, and is then recorded on the magnetic tape 7 by the magnetic heads 4a and 4b. The servo circuit 51 outputs the tracking control pulse CTL with the same timing as that described above, i.e., one time per one revolution of the rotating drum 6, to the magnetic head 5, to record the tracking control pulse CTL on the magnetic tape 7. To be more specific, the recording timing of the rising edge (shown by the arrow ↑) of the tracking control pulse CTL is set to a time point delayed by the specific time (Δt) after termination of the recording by the minus (−) azimuth magnetic head 4b.

Figure 8:
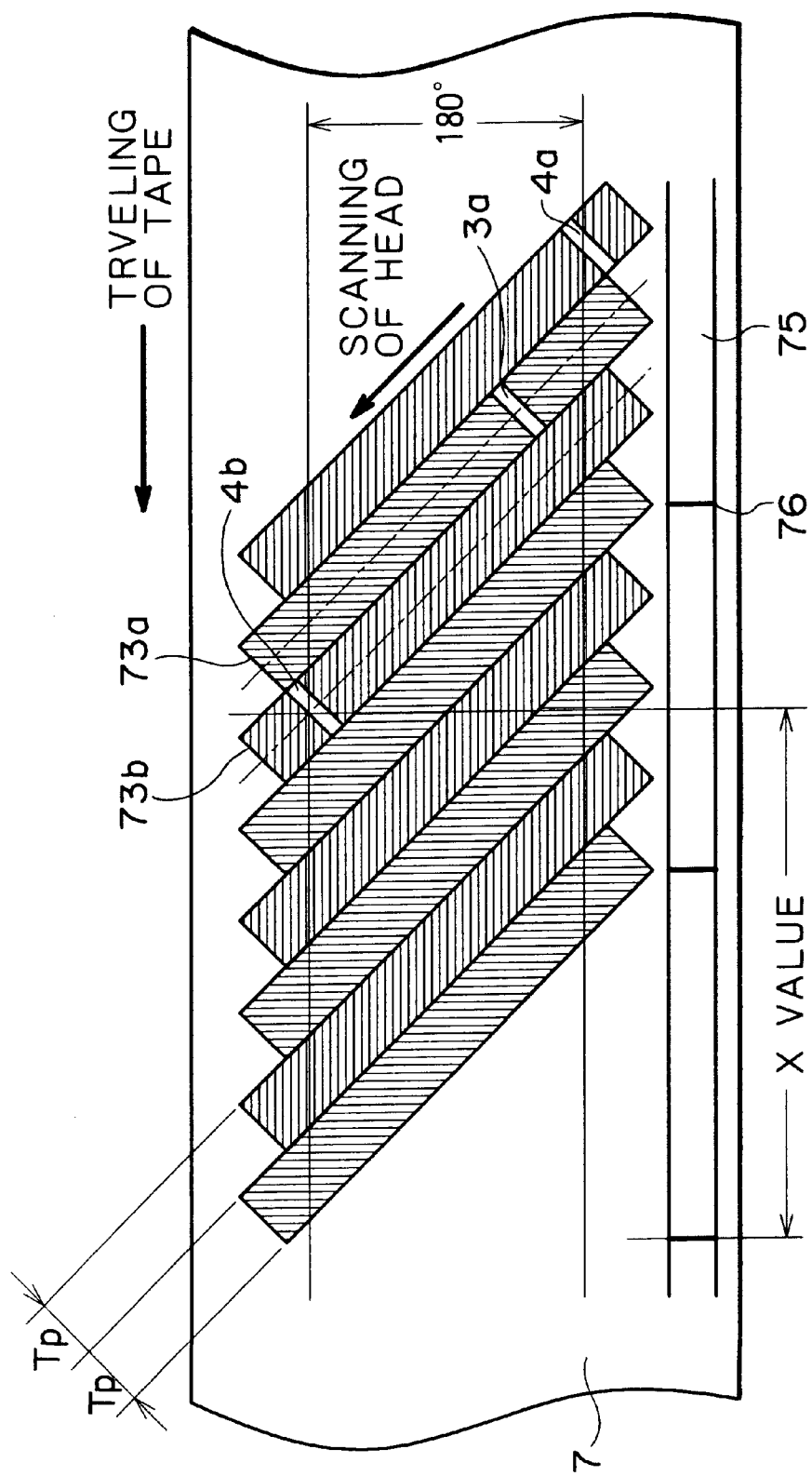
FIG. 8 is a diagram of the pattern of a recording track on the magnetic tape in the high rate mode.

FIG. 8 is a diagram showing a recording pattern on the magnetic tape 7 in the above HS mode. As shown in FIG. 8, the X value is made nearly equal to that in the STD mode by the above recording timing, so that it is possible to attain compatibility upon reproducing digital signals with an apparatus having a different head configuration.

Since one tracking control pulse CTL is recorded per one revolution of the rotating drum 6, it is recorded one time per four tracks; however, since the number of recording pulses per traveling time of the magnetic tape 7 is the same as that in the STD mode, the control of traveling of the magnetic tape 7 while reproducing digital signals can be made identical to that in the STD mode. The azimuth angles of the magnetic heads 3a, 3b, 4a and 4b are of course set to the same values as those of the magnetic heads 2a and 2b used for the standard mode, for example, ±30°.

Upon reproducing digital signals in the HS mode, similar to the manner upon reproducing digital signals in the STD mode, the servo circuit 51 controls the capstan 8 in such a manner that tracking is optimized on the basis of the level of the tracking control pulse CTL or a reproducing signal SPA or SPB. Digital signals reproduced by the magnetic heads 3a, 3b, 4a and 4b are amplified by the recording/reproducing amplifiers 33 and 43, being inputted to the digital signal recording/reproducing circuit 32 via the switching circuit 60 and subjected to a specific processing such as error correction thereat, and are outputted from the output terminal 34.

It should be noted that tracking may be performed in such a manner that the sum of the levels of the reproducing signals SPA and SPB for two channels is maximized. This makes it possible to optimize tracking for two channel tracks from which the signals are simultaneously reproduced, or tracking may be performed in such a manner that the reproducing level for each channel becomes a specific value or more.

The operation of the apparatus in the long-time recording/ reproducing mode for digital signals will be described below.

Upon recording digital signals in the long-time recording/ reproducing mode, the number of revolutions of the rotating drum 6 is made identical to that in the STD mode and only the traveling speed of the magnetic tape 7 is made slow, to change the recording timing.

Figure 9:
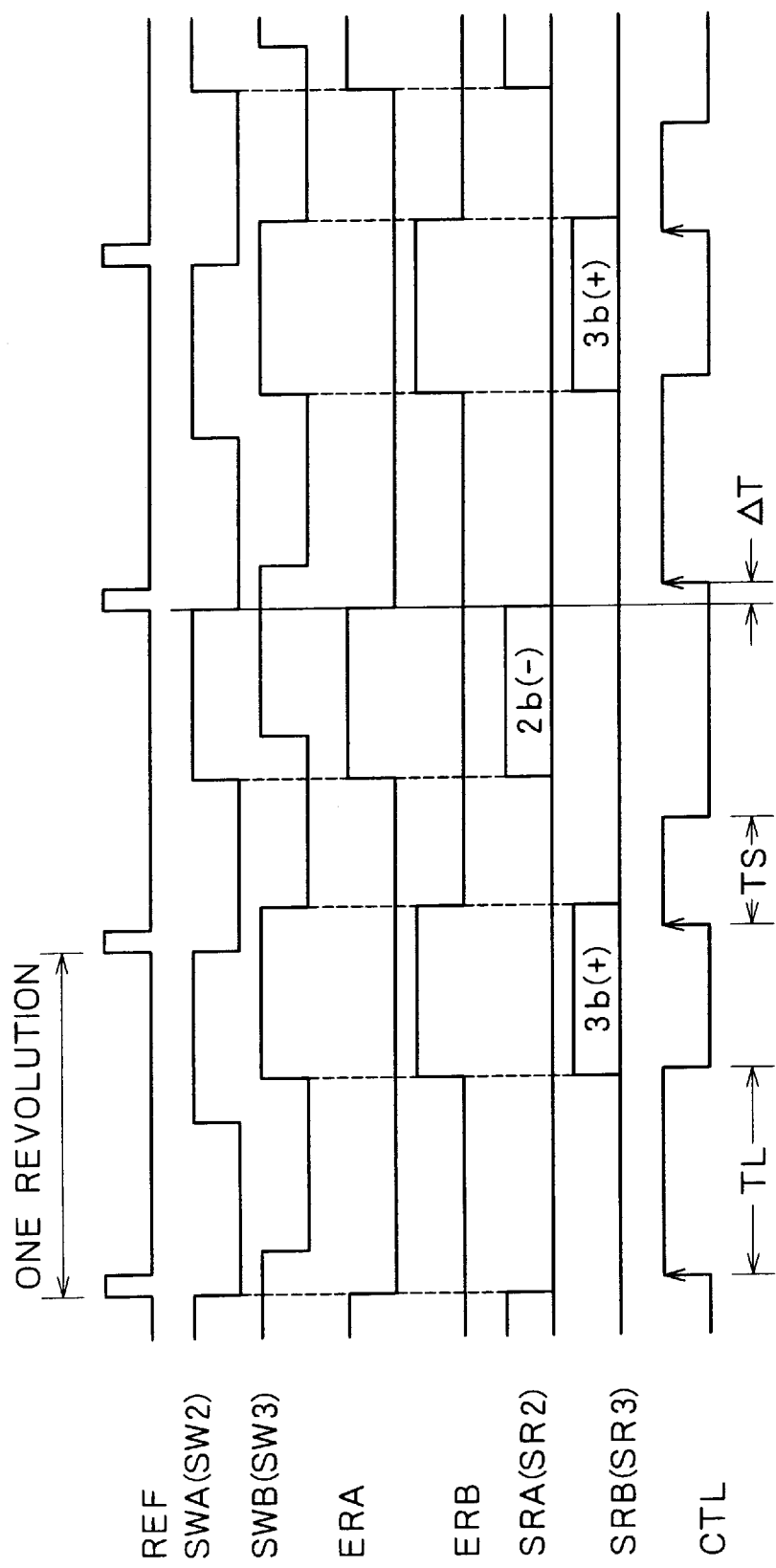
FIG. 9 is a timing chart which relates to the recording of a digital signal in a long-time mode which is twice as long as the standard mode.

FIG. 9 is a diagram showing a recording timing in the long-time recording/reproducing mode, which is twice as long as the STD mode (hereinafter, referred to as an "LS2 mode"), and in which the traveling speed of the magnetic tape 7 is one-half that in the STD mode. The reference signal REF is the same as that in the STD mode shown in FIG. 5. The servo circuit 51 controls the rotation of the rotating drum 6 on the basis of the reference signal REF, and outputs the head switching signals SWA and SWB to the digital recording/reproducing circuit 32. The digital recording/ reproducing circuit 32 outputs the recording signals SRA and SRB and recording control signals ERA and ERB indicating effective regions of the recording signals SRA and SRB on the basis of the head switching signals SWA and SWB. The recording signal SRA is inputted in the recording/ reproducing amplifier 23 via the switching circuit 60, where it is amplified to a specific level, and is recorded on the magnetic tape 7 only by the magnetic head 2b. Similarly, the recording signal SRB is inputted in the recording/ reproducing amplifier 33 via the switching circuit 60, where it is amplified to a specific level, and is recorded on the magnetic tape 7 only by the magnetic head 3b. At this time, the recording/reproducing amplifies 23 and 33 may be operated in the usual manner in the recording mode, or they may be operated in the recording/reproducing mode on the basis of the recording control signals ERA and ERB if the sub-code region is required to be after-recorded.

As shown in FIG. 9, each of the recording signals SRA and SRB is outputted and recorded one time per two revolutions of the rotating drum 6. To be more specific, recording is performed on two tracks per two revolutions of the rotating drum 6. Accordingly, the recording rate of digital signals becomes a half of that in the STD mode, however, the track pitch Tp and the recording frequency can be made identical to those in the STD mode.

The tacking control pulse CTL is recorded with the same cycle as that in each of the STD mode shown in FIG. 5 and the HS mode shown in FIG. 7, that is, one time per one revolution of the rotating drum 6. Like the STD mode and HS mode, the recording timing of the rising edge (shown by the arrow ↑) of the tracking control pulse CTL is set to a time point delayed by a specific time (Δt) after termination of the recording by the minus (−) azimuth magnetic head 2b.

According to the present invention, since each of the recording signals SRA and SRB is outputted one time per two revolutions of the rotating drum 6, the tracking control pulse CTL is recorded with the pulse width alternately changed (TL or TS) one time per two revolutions of the rotating drum 6. The timing of changing the recording pulse width is determined, for example, by adjusting the pulse width TL to the rotation in which recording is performed by the plus (+) azimuth magnetic head 3b. This is effective to facilitate the tracking upon reproducing digital signals. Table 1 shows one example of the pulse widths TL and TS of the tracking control pulse CTL in the form of the duty cycle.

TABLE 1

|  | Pulse "L" (TL) | Pulse "S" (TS) |
| --- | --- | --- |
| Pulse "0" | 62.5 ± 0.5% | 57.5 ± 0.5% |
| Pulse "1" | 30 ± 0.5% | 25 ± 0.5% |

Figure 10:
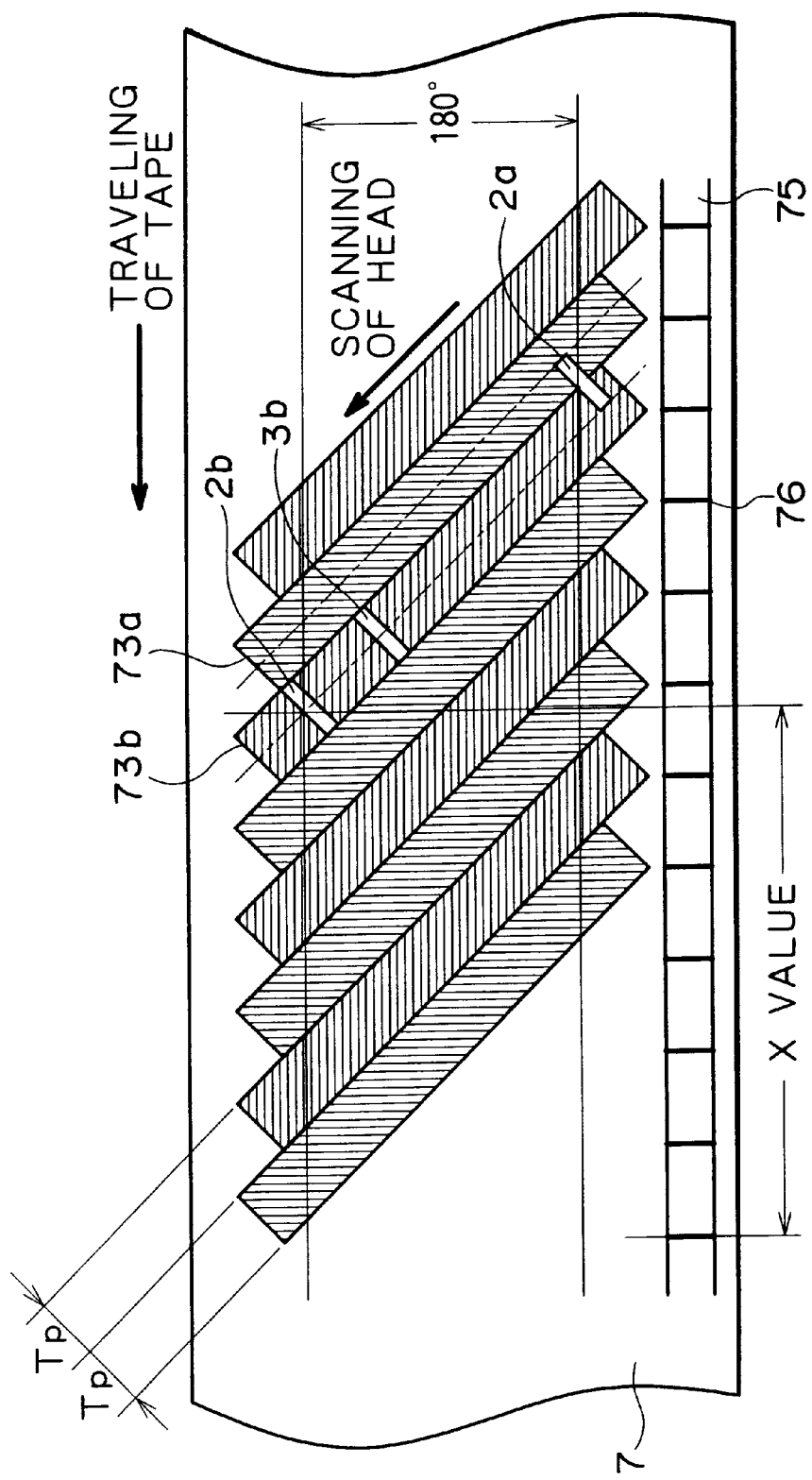
FIG. 10 is a diagram of the pattern of a recording track on the magnetic tape in the long-time mode which is twice as long as the standard mode.

FIG. 10 is a diagram showing a recording pattern on the magnetic tape 7 in the LS2 mode.

As shown in FIG. 10, the X value becomes a value nearly equal to that in each of the STD mode and HS mode by setting the above recording timing, so that it is possible to attain compatibility upon reproducing digital signals with an apparatus having a different head configuration.

In addition, since the tracking control pulse CTL is recorded one time per one revolution of the rotating drum 6, it is apparently recorded for each track, however, since the number of the recording pulses per traveling time of the magnetic tape 7 is the same as that in each of the STD mode and HS mode, the control of traveling of the magnetic tape 7 upon reproducing digital signals can be made identical to that in each of the STD mode and HS mode.

Figure 11:
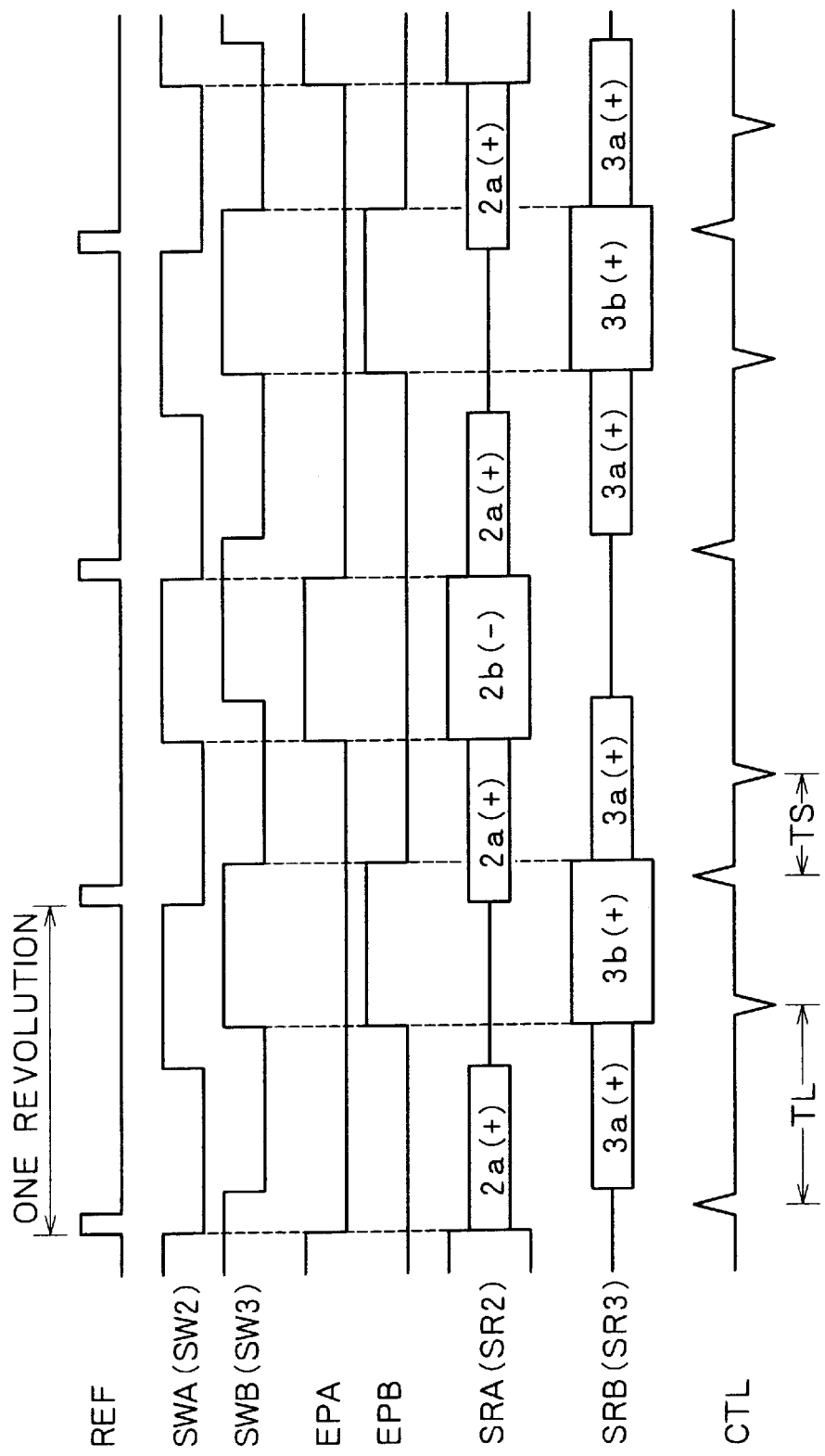
FIG. 11 is a timing chart which relates to the reproducing of a digital signal in the long-time mode which is twice as long as the standard mode.

FIG. 11 is a diagram showing a reproducing timing of digital signals in the LS2 mode. Each of the reference signal REF and the head switching signals SWA and SWB is reproduced with the same recording timing as that shown in FIG. 9. The servo circuit 51 controls the traveling speed of the magnetic tape 7 in such a manner that the tracking control pulse CTL keeps a specific phase with respect to the reference signal REF, to thereby make the traveling speed of the magnetic tape 7 identical to that used during the recording of digital signals. At this time, each of the magnetic heads 2b and 3b scans two times per one track, however, the head accurately scans only one time. As a result, each of the reproducing reference signals EPA and EPB having an H level is created at the rate of one track per two tracks. Then, reproducing may be performed by detecting the levels of the reproducing signals SPA and SPB at the time when the reproducing reference signals EPA and EPB are at the H level, performing tracking such that the sum of or either of the levels of the reproducing signals SPA and SPB is maximized, and inputting the reproducing signals at that time in the digital signal recording/reproducing circuit 32.

The reproducing reference signals EPA and EPB can be easily created by detecting the pulse width of the reproduced tracking control pulse CTL.

Figure 12:
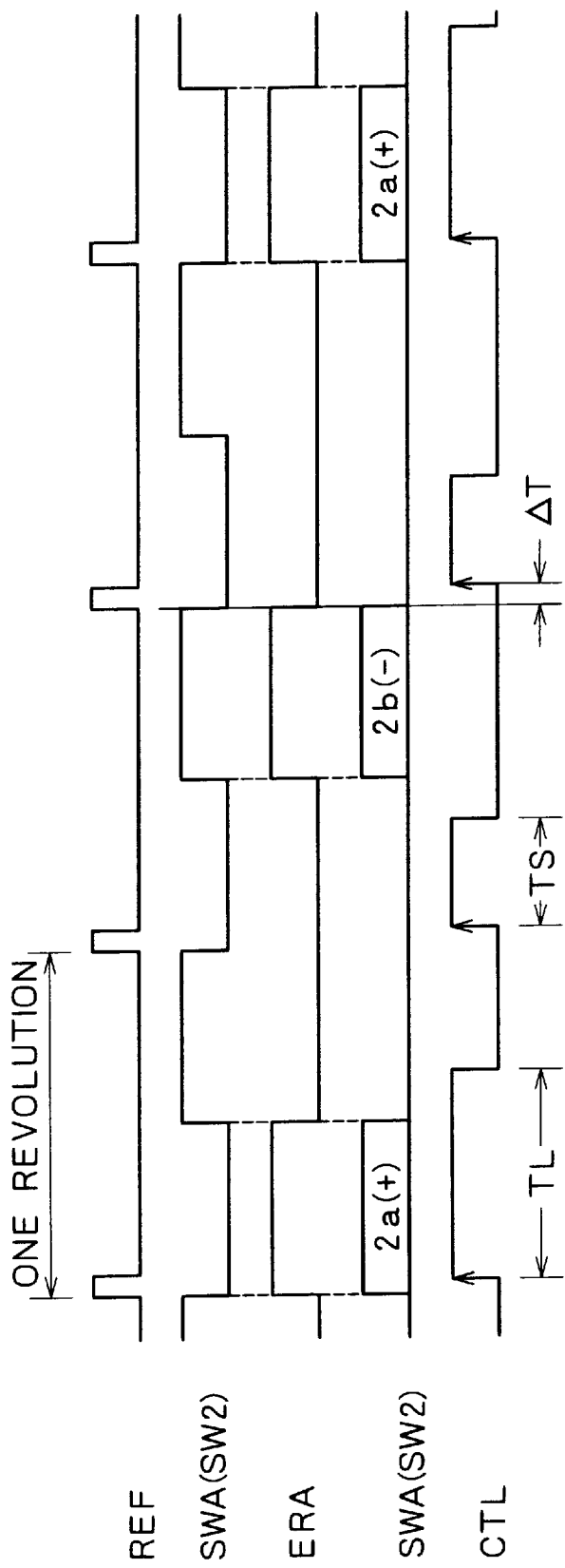
FIG. 12 is a timing chart which relates to the recording of a digital signal in a long-time mode which is three times as long as the standard mode.

FIG. 12 is a diagram showing a recording timing of a long-time recording/reproducing mode which is three times as long as the STD mode (hereinafter, referred to as an "LS3 mode"), and in which the traveling speed of the magnetic tape 7 is one-third that in the STD mode. Even in this case, the reference signal REF is the same as that in the STD mode shown in FIG. 5. A recording signal SRA is outputted one time per three tracks, and is recorded on the magnetic tape 7 by the magnetic heads 2a and 2b. To be more specific, recording is performed on two tracks per three revolutions of the rotating drum 6. As a result, the recording rate of digital signals becomes one-third that in the STD mode, however, the track pitch Tp and the recording frequency can be made identical to those in the STD mode.

Figure 13:
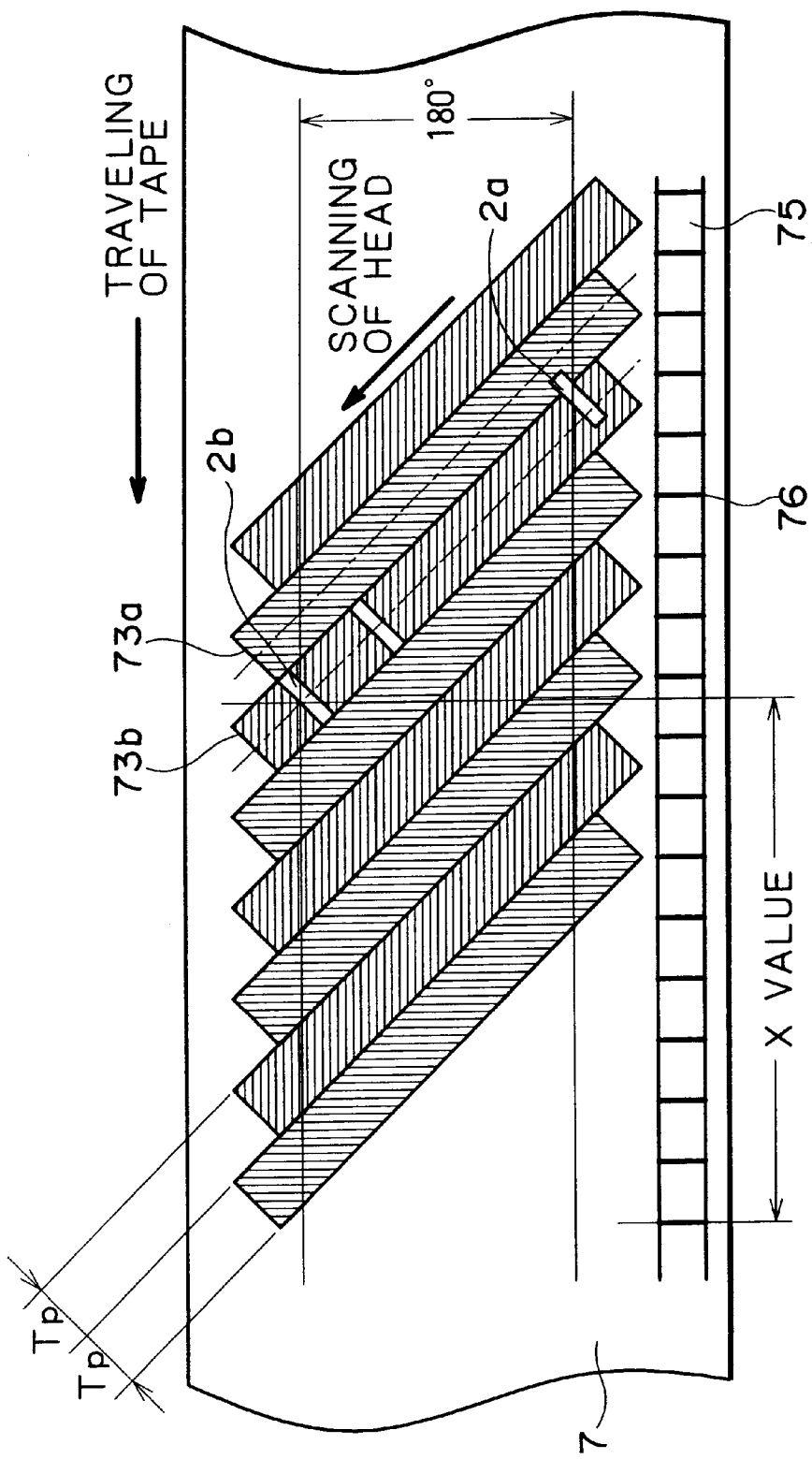
FIG. 13 is a diagram of the pattern of a recording track on the magnetic tape in the long-time mode which is three times as long as the standard mode.

The tracking control pulse CTL is recorded with the same cycle as that in the STD mode shown in FIG. 5, that is, one time per one revolution of the rotating drum 6. Like the STD mode, HS mode and LS2 mode, the recording timing of the rising edge (shown by the arrow ↑) of the tracking control pulse CTL is set to a time point delayed by a specific time (Δt) after termination of the recording by the minus (−) azimuth magnetic head 2b. With this configuration, the recording pattern on the magnetic tape 7 becomes that shown in FIG. 13, in which the X value is nearly equal to that in each of the STD mode, HS mode and LS2 mode, so that it is possible to attain compatibility upon reproducing digital signals with an apparatus having a different head configuration.

In addition, since the tracking control pulse CTL is recorded one time per one revolution of the rotating drum 6, it is recorded three times per two tracks; however, since the number of the recording pulses per traveling time of the magnetic tape 7 is the same as that in the STD mode, the control of traveling of the magnetic tape 7 upon reproducing digital signals can be made identical to that in the STD mode.

Like the LS2 mode, the tracking control pulse CTL is recorded with the pulse width alternately changed one time per three revolutions of the rotating drum 6. The timing of changing the recording pulse width is determined in the same manner as that in the LS2 mode. That is to say, the pulse width TL is adjusted, for example, to rotation in which the recording is performed by the plus (+) azimuth magnetic head 2a. This is effective to facilitate the tracking during the reproducing of digital signals.

Figure 14:
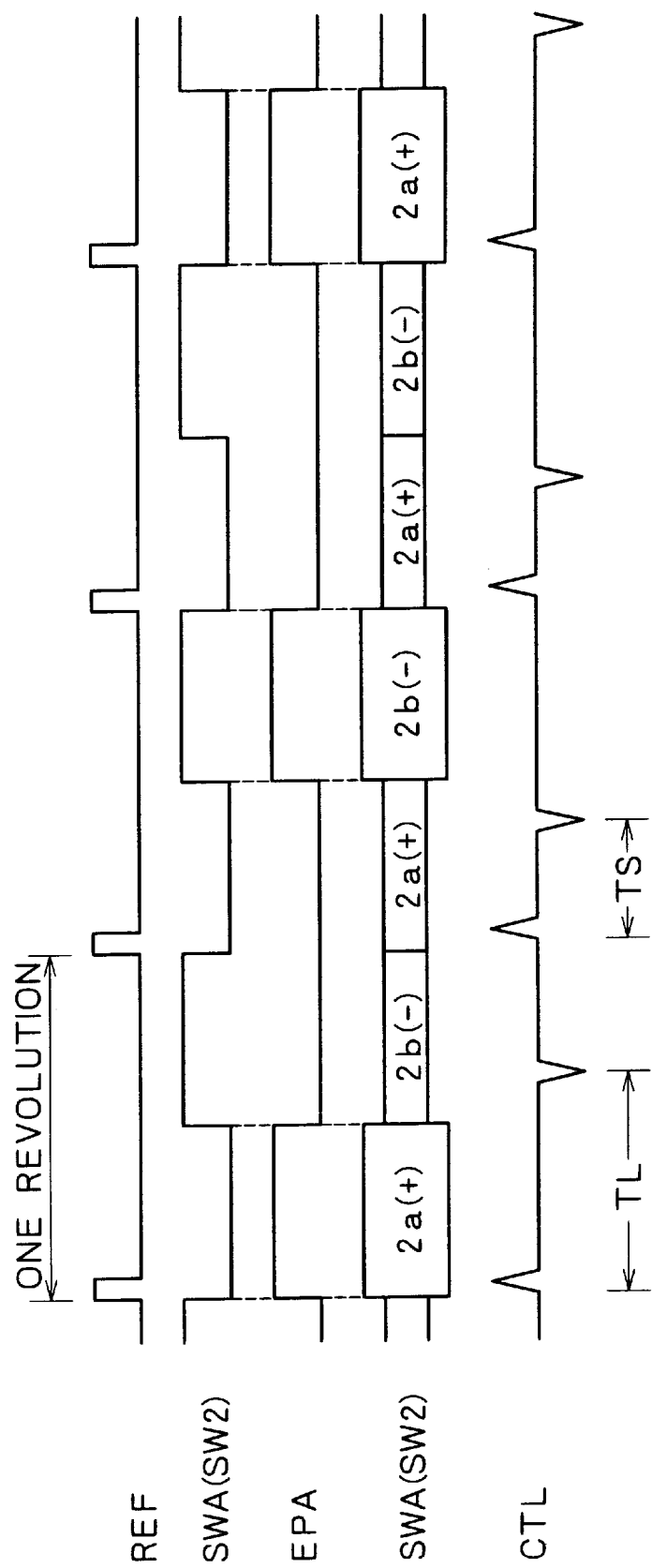
FIG. 14 is a timing chart obtained upon reproducing a digital signal in the long-time mode which is three times as long as the standard mode.

FIG. 14 is a diagram showing a reproducing timing of digital signals in the LS3 mode. Each of the reference signal REF and the head switching signal SWA is reproduced with the same timing as the recording timing shown in FIG. 12. During the reproducing of digital signals, the servo circuit 51 controls the traveling speed of the magnetic tape 7 in such a manner that the tracking control pulse CTL keeps a specific phase with respect to the reference signal REF, to thereby make the traveling speed of the magnetic tape 7 identical to that used for the recording of digital signals. At this time, each of the magnetic heads 2a and 2b scans three times per one track, the head accurately scans only one time. As a result, as shown in FIG. 14, the reproducing reference signal EPA having an H level is created at the rate of one track per three tracks. Then, the reproducing is performed by detecting the level of the reproducing signal SPA at the time when the reproducing reference signal EPA is at the H level, performing tracking such that the level of the reproducing signal SPA is maximized, and inputting the reproducing signal at that time in the digital signal recording/reproducing circuit 32. The reproducing reference signal EPA can be easily created by detecting the pulse width of the reproduced tracking control pulse CTL.

In a long-time recording/reproducing mode which is N times as long as the STD mode (N: integer excluding 2), a signal may be recorded or reproduced on or from two tracks per N-revolutions of the rotating drum 6. In particular, for the long-time recording/reproducing mode in which N is an odd number such as three, a signal can be recorded/reproduced by using the magnetic heads 2a and 2b like the STD mode.

At this time, like each of the above-described modes, the recording timing of the rising edge of the tracking control pulse CTL to be recorded one time per one revolution of the rotating drum 6 is set to a time point delayed by a specific time (Δt) after termination of the recording by the minus (−) azimuth magnetic head. Also, like the LS2 mode and LS3 mode, the timing of changing the pulse width of the tracking control pulse CTL one time per N-revolutions of the rotating drum 6 is determined by adjusting the pulse width TL to a rotation in which recording is performed by the plus (+) azimuth magnetic head.

Table 2 shows an example of the diameter of a drum, the number of revolutions of the drum, and the tape speed in each mode in the case where the track pitch Tp is set at 29 μm, and Table 3 shows an example of the diameter of a drum, the number of revolutions of the drum, and the tape speed in each mode in the case where the track pitch Tp is set at 19 μm. In these tables, character LS5 designates a long-time recording/reproducing mode which is five times as long as the STD mode, and LS7 is a long-time recording/reproducing mode which is seven times as long as the STD mode. Also, the recording time is a value obtained in the case of using a cassette tape specified by DF-300 of D-VHS Standard.

TABLE 2

| Mode | HS | STD | LS2 | LS3 | LS5 | LS7 |
| --- | --- | --- | --- | --- | --- | --- |
| Diameter of Drum | | | 62 mm | | | |
| Number of revolution of drum | | | 1800 rpm | | | |
| Tape speed | 33.35 mm/s | 16.67 mm/s | 8.33 mm/s | 5.55 mm/s | 3.33 mm/s | 2.38 mm/s |
| Track pitch | | | 29 μm | | | |
| Recording time | 2.5 hr | 5 hr | 10 hr | 15 hr | 25 hr | 35 hr |

TABLE 3

| Mode | HS | STD | LS2 | LS3 | LS5 | LS7 |
| --- | --- | --- | --- | --- | --- | --- |
| Diameter of Drum | | | 62 mm | | | |
| Number of revolution of drum | | | 1800 rpm | | | |
| Tape speed | 22.24 mm/s | 11.12 mm/s | 5.55 mm/s | 3.70 mm/s | 2.22 mm/s | 1.58 mm/s |
| Track pitch | | | 19 μm | | | |
| Recording time | 3.75 hr | 7.5 hr | 15 hr | 22.5 hr | 37.5 hr | 42.5 hr |

Figure 15:
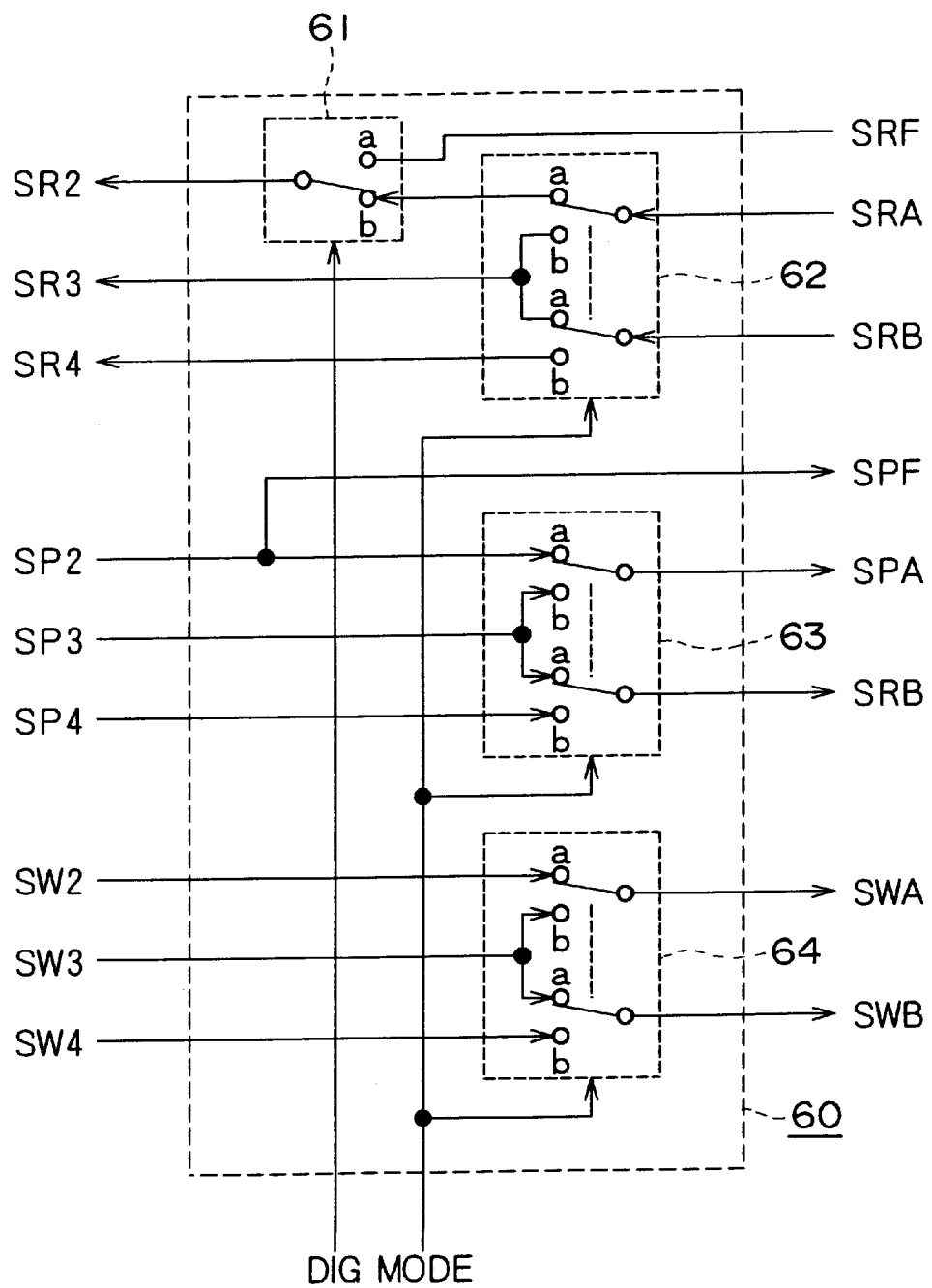
FIG. 15 is a schematic circuit diagram showing one example of a switching circuit.

FIG. 15 is a schematic circuit diagram of the switching circuit 60. In this figure, reference numeral 61 designates a switching circuit for switching the analog audio recording signal SRF to or from the digital recording signal SRA. In this switching circuit 61, a terminal "a" is closed if a signal is determined to be an analog signal on the basis of a control signal DIG indicating whether a signal is an analog signal or a digital signal, and a terminal "b" is closed if a signal is determined to be a digital signal on the basis of the control signal DIG. Reference numeral 62 designates a switching circuit for switching the digital recording signals SRA and SRB; 63 is a switching circuit for switching the digital reproducing signals SPA and SPB; and 64 is a switching circuit for switching the head switching signals SWA and SWB. Each of the switching circuits 62, 63 and 64 is controlled on the basis of a digital mode control signal MODE. To be more specific, in each of the circuits 62, 63 and 64, a terminal "a" is closed for the STD mode, LS2 mode or LS3 mode, and a terminal "b" is closed for the HS mode. With this configuration, the relationship between the magnetic heads used in each mode and the signal recorded/reproduced by the heads can be set as described above.

In the case where the magnetic heads 2a and 2b are specialized for recording/reproducing digital signals and heads for recording/reproducing analog audio signals are provided separately from the magnetic heads 2a and 2b, the switching circuit 61 is not required. The switching circuit 62 can be easily integrated in the digital signal recording/reproducing circuit 32, and the switching circuit 64 can be also integrated in the servo circuit 51. The switching circuit 63 can also be integrated in the digital signal recording/reproducing circuit 32, although it requires switching between an analog signal and a digital signal.

Figure 16:
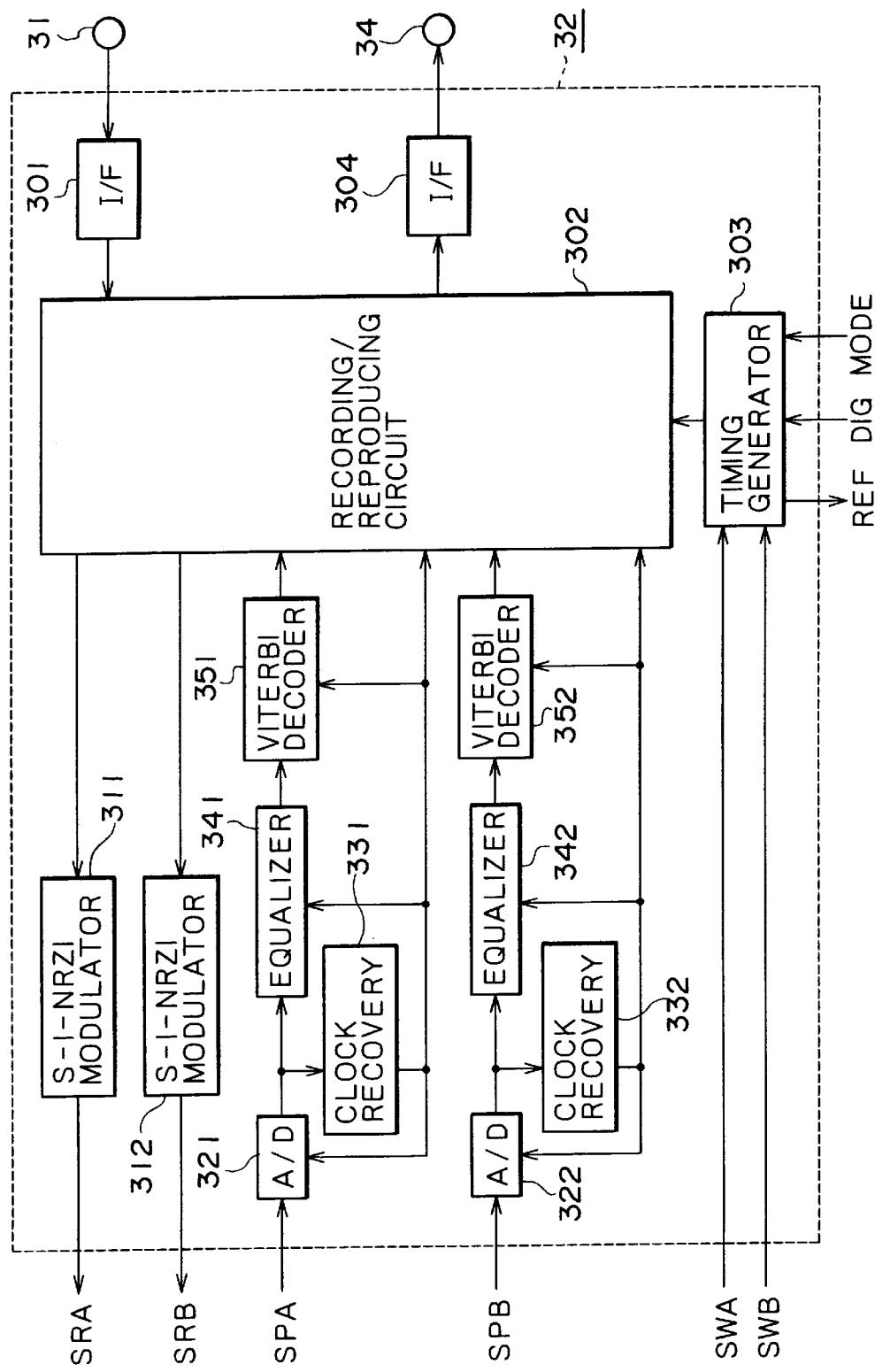
FIG. 16 is a block diagram showing one example of a digital recording/reproducing circuit.

FIG. 16 is a block diagram of the digital signal recording/reproducing circuit 32. In this figure, reference numeral 301 and 304 designate interface circuits; 302 is a recording/reproducing circuit; 303 is a timing generator circuit; 311 and 312 are modulator circuits; 321 and 322 are A/D converter circuits; 331 and 332 are clock recovery circuits; 341 and 342 are equalizer circuits; and 351 and 352 are viterbi decoder circuits.

In the STD mode and LS3 mode, upon recording digital signals, a digital signal inputted from the input terminal 31 is inputted in the recording/reproducing circuit 302 via the interface circuit 301. The digital signal is subjected to a processing, such as addition of an error correction code at the recording/reproducing circuit 302, and is modulated in the modulator circuit 311. As a result, the recording signal SRA with the recording timing shown in FIGS. 5 or 12 is created. At this time, the output from the modulator circuit 312 is stopped. During the reproducing of digital signals, the inputted reproducing signal SPA is subjected to A/D conversion by the A/D converter circuit 321, is equalized by the equalizer circuit 341, is viterbi-decoded by the viterbi decoder circuit 351, and is inputted in the recording/reproducing circuit 302. The clock recovery circuit 331 recovers the clock signal which has been synchronized with the bit cycle of the recorded digital signal. The output of a clock signal from the clock recovery circuit 332 is stopped, and also the operations of the A/D converter circuit 322, equalizer circuit 342 and viterbi decoder circuit 352 are stopped. The digital signal which has been inputted to the recording/reproducing circuit 302 is subjected to processing, such as error correction, and is outputted from the output terminal 34 via the interface circuit 304.

In the HS mode and LS2 mode, during the recording of digital signals, a digital signal inputted from the input terminal 31 is inputted in the recording/reproducing circuit 302 via the interface circuit 301. Like the STD mode and LS3 mode, the digital signal is subjected to processing such as addition of an error correction code in the recording/reproducing circuit 302, is distributed to two channels, and is modified by the modulator circuits 311 and 312. As a result, the recording signals SRA and SRB are created with the timings shown in FIG. 7 or 9. Upon reproducing digital signals, the inputted reproducing signals SPA and SPB for two channels are converted by the A/D converter circuits 321 and 322, equalized by the equalizer circuits 341 and 342, viterbi-decoded by the viterbi decoder circuits 351 and 352, and are inputted in the recording/reproducing circuit 302. Like the STD mode and LS3 mode, the signals which have been inputted in the recording/reproducing circuit 302 are subjected to processing such as error correction processing, and are outputted from the output terminal 34 via the interface circuit 304.

In this way, in the recording/reproducing circuit 302, even in any mode, the same processing is performed only by changing the processing rate. To be more specific, even in any mode, the data on the track shown in FIG. 2 can be recorded or reproduced in the recording/reproducing circuit 302.

The timing generator circuit 303 receives the analog/digital control signal DIG and the digital mode control signal MODE, and outputs the servo reference signal REF and generates the timing signal of the entire digital signal recording/reproducing circuit 32.

Figure 17:
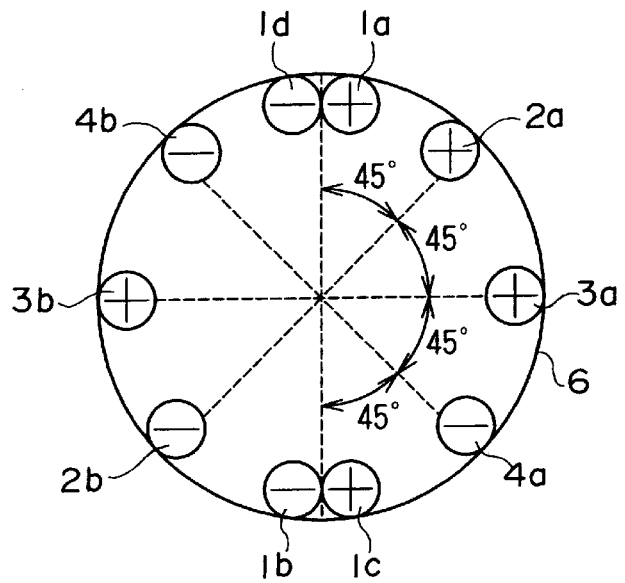
FIG. 17 is a diagram showing one example of a head arrangement.

FIG. 17 is a diagram showing one example of a head arrangement matched to all of the above modes. In this head arrangement, the analog video signal recording/reproducing magnetic heads 1a and 1b, the digital signal recording/reproducing magnetic heads 2a and 2b for the STD mode, and the digital signal recording/reproducing magnetic heads 3a, 3b, 4a and 4b for the HS mode are spaced from each other at intervals of 45° in the order of the magnetic heads 1a, 2a, 3a, 4a, 1b, 2b, 3b and 4b. The magnetic heads 2b and 3b are used for recording/reproducing digital signals in the LS2 mode, and like the STD mode, the magnetic heads 2a and 2b are used for recording/reproducing digital signals in the LS3 mode. In addition, magnetic heads 1c and 1d are specialized for the above-described long-time recording/reproducing mode for analog video signals, and are disposed in proximity to the magnetic heads 1a and 1b used for the standard recording/reproducing mode for analog video signals, respectively.

Figure 18:
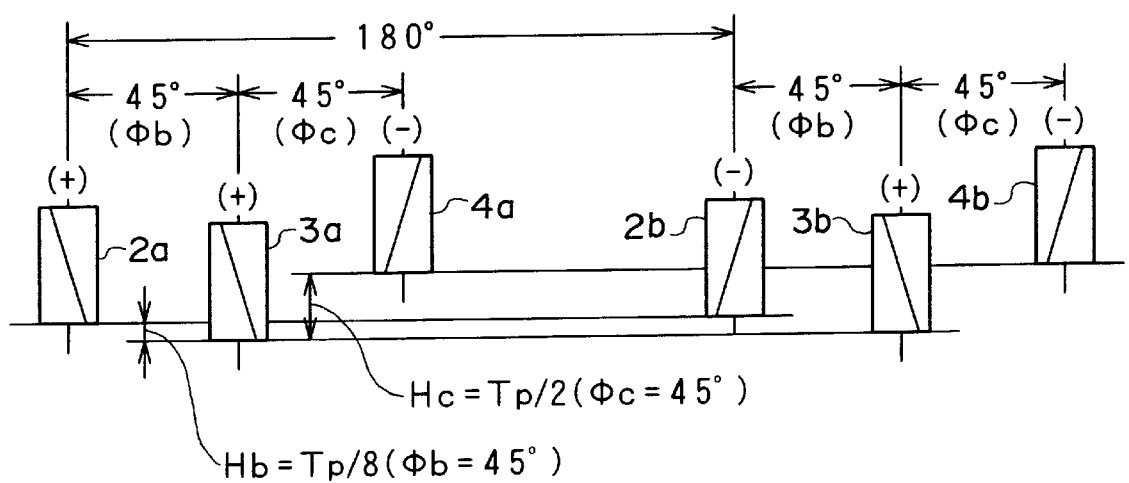
FIG. 18 is a diagram showing each difference in height between heads arranged in accordance with the head arrangement shown in FIG. 17.

FIG. 18 is a diagram showing each difference in height between heads arranged in accordance with the head arrangement shown in FIG. 17. A height difference Hb between the magnetic heads 2b and 3b used for recording/reproducing digital signals in the LS2 mode is given by $$Hb = (Tp/2) \times (\phi\, b/180°) \quad (1)$$

where $\phi\, b$ is a difference in distribution angle between the magnetic heads 2b and 3b and Tp is a track pitch. In the head arrangement shown in FIG. 17, since the difference $\phi\, b$ in distribution angle is 45°, the height difference Hb becomes Tp/8.

A height difference Hc between the magnetic heads 3a and 4a and between the magnetic head 3b and 4b is given by $$Hc = Tp - (2 \times Tp) \times (\phi\, c/180°) \quad (2)$$

where $\phi\, c$ is a difference in distribution angle between the magnetic heads 3a and 4a and between the magnetic heads 3b and 4b. In the head arrangement shown in FIG. 17, the difference $\phi\, c$ in distribution angle is 45°, and the height difference Hc becomes Tp/2.

It should be noted that the relationship between the distribution angle and the height difference in each of the above equations (1) and (2) indicates an ideal value, and if the magnetic heads are mounted with specific mechanical accuracies and substantially satisfy the above relationship, it may be considered that the above ideal relationship can be practically applied to the arrangement of the magnetic heads without any problem.

With above-described head configuration and the height difference, it is possible to realize the recording patterns shown in FIGS. 6, 8, 10 and 13 by recording digital signals with timings shown in FIGS. 5, 7, 9 and 12, respectively, and hence to uniquely determine the physical position of the tracking control pulse CTL with respect to the digital signal recording track on the magnetic tape irrespective of the mode.

In this head arrangement, since all the digital signal recording/reproducing magnetic heads are separated from each other, they can be configured as single magnetic heads not required to be subjected to complicated works, so that the manufacturing cost can be reduced. Also since the magnetic heads can be easily, uniformly brought into contact with the magnetic tape, the reliability of the apparatus can be improved.

With respect to the height difference for the analog video signal recording/reproducing magnetic heads 1a, 1b, 1c and 1d and the digital signal recording/reproducing magnetic heads 2a and 2b for the STD mode, if the magnetic heads 2a and 2b are used for recording/reproducing not only digital signals but also analog audio signals, the height difference for the above magnetic heads may be set in accordance with the standard of the conventional analog VTR, and if the magnetic heads 2a and 2b are specialized for recording/reproducing digital signals, the height difference for the above magnetic heads may be suitably set irrespective of the standard of the conventional VTR.

While each of the differences $\phi\, b$ and $\phi\, c$ in the distribution angle is set to 45° in the head arrangement shown in FIG. 17, such description is for illustrative purposes only, and each of the differences $\phi\, b$ and $\phi\, c$ can be arbitrarily set. To be more specific, an ideal recording pattern can be formed in any one of the above-described modes by setting the height difference Hb to the value obtained by the equation (1) depending on the difference $\phi\, b$ in distribution angle and also being setting the height difference Hc to the value obtained by the equation (2) depending on the difference $\phi\, c$ in distribution angle.

Figure 19:
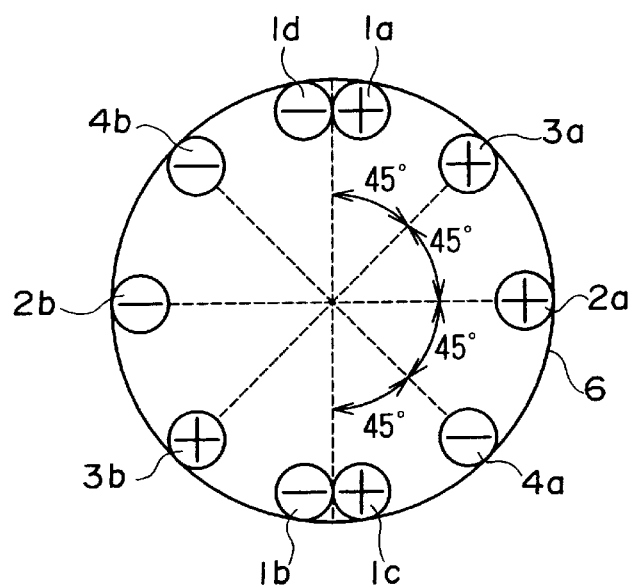
FIG. 19 is a diagram showing another example of the head arrangement.

FIG. 19 is a diagram showing another head arrangement which is changed from that shown in FIG. 17 in that the positions of the magnetic heads 2a and 2b are replaced with the magnetic heads 3a and 3b, and the magnetic heads 3a and 3b are spaced from the magnetic heads 4a and 4b by 90°, respectively. The combination of the magnetic heads used for recording/reproducing signals in each mode is the same as that shown in FIG. 17.

Figure 20:
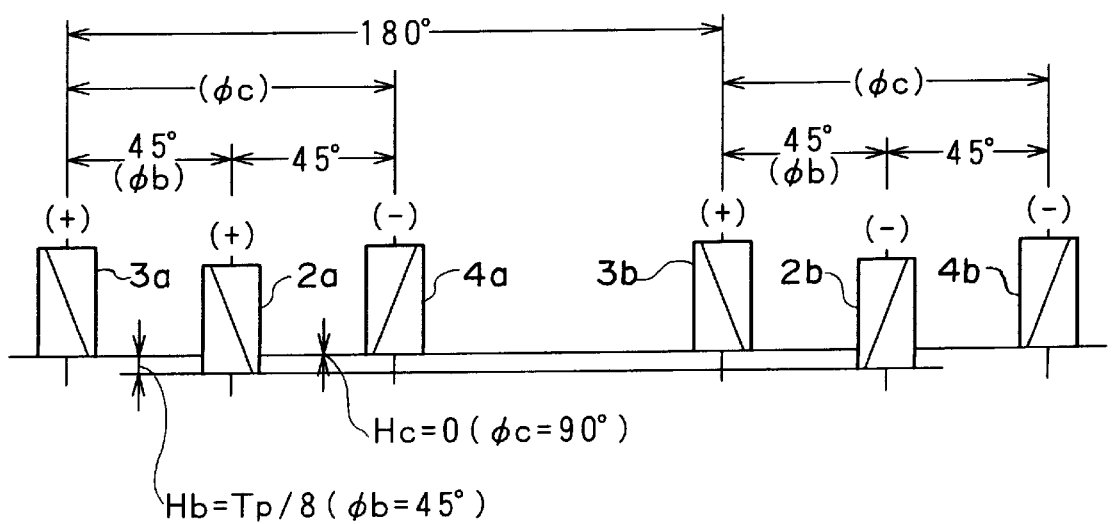
FIG. 20 is a diagram showing each difference in height between heads arranged in accordance with the head arrangement shown in FIG. 19.

FIG. 20 is a diagram showing each difference in height between the heads arranged in accordance with the head arrangement shown in FIG. 19. A height difference Hb between the magnetic heads 2b and 3b used for recording/reproducing digital signals in the LS2 mode is given by the equation (1) like the height difference Hb in the head arrangement shown in FIG. 18. Since the difference φ b in distribution angle is 45°, the height difference Hb becomes Tp/8. A height difference Hc between the magnetic heads 3a and 4a and between the magnetic heads 3b and 4b used for recording/reproducing digital signals in the HS mode is similarly given by the equation (2). Since the difference φ c in distribution angle is 90°, the height difference Hc becomes 0.

With the above head arrangement and height differences, it is possible to record/reproduce digital signals for both the track pitch Tp=29 μm shown in Table 2 and the track pitch Tp=19 μm shown in Table 3 in all the modes excluding the LS2 mode only by the single head arrangement. To be more specific, since the magnetic heads 2a and 2b used for the STD, LS3, LS5 and LS7 modes in the above head arrangement are mounted at the same height, the head arrangement can be applied to any track pitch. Further, since the magnetic heads 3a, 3b, 4a and 4b used for the HS mode in the above head arrangement are also mounted at the same height, the head arrangement can be applied to any track pitch. Accordingly, by setting the gap width of each of the above magnetic heads to a value ranging from about 29 μm to about 33 μm, the head arrangement can be applied to both the track pitch Tp=29 μm and the track pitch 19 μm.

Figure 21:
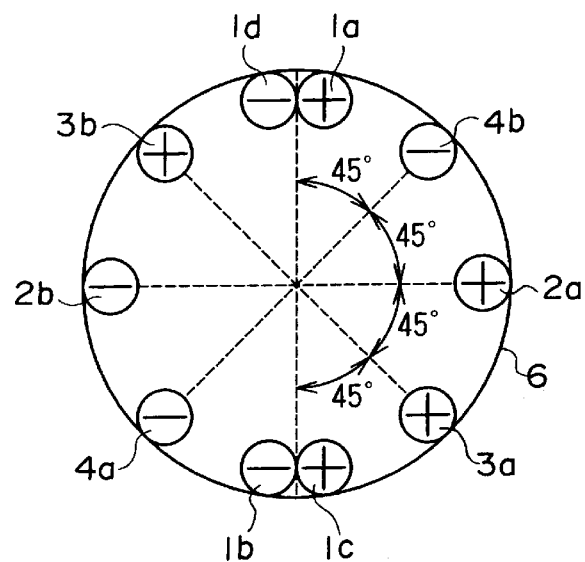
FIG. 21 is a diagram showing a further example of the head arrangement.

FIG. 21 is a diagram showing a further head arrangement which is changed from the that shown in FIG. 19 in that the magnetic heads 3a, 3b, 4a and 4b are each turned by 90°. The combination of the magnetic heads for recording/reproducing digital signals in each mode is the same as that shown in each of FIGS. 17 and 19.

Figure 22:
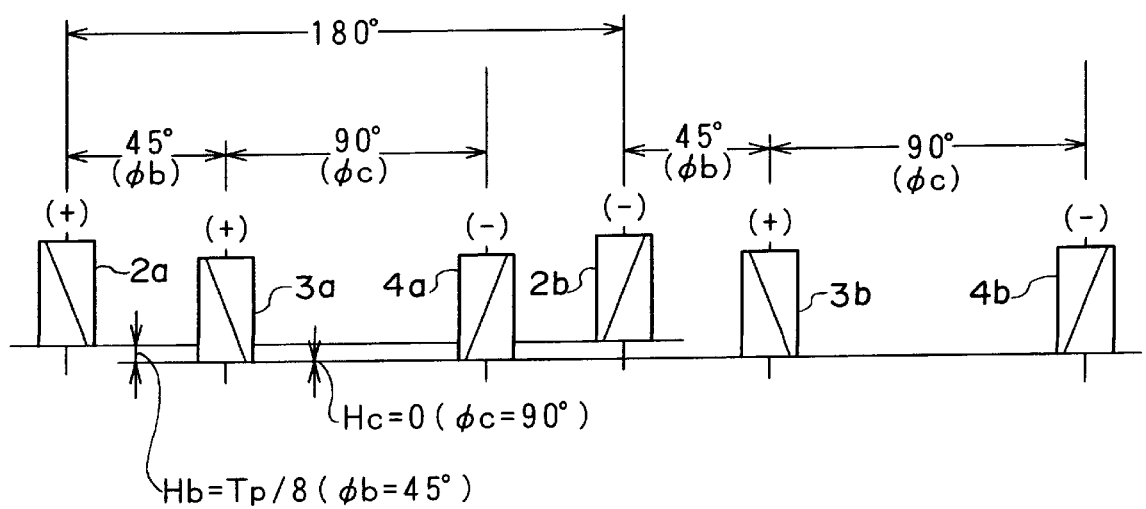
FIG. 22 is a diagram showing each difference in height between heads arranged in accordance with the head arrangement shown in FIG. 21.

FIG. 22 is a diagram showing each difference in height between the heads arranged in accordance with the head arrangement shown in FIG. 21. A height difference Hb between the magnetic heads 2b and 3b used for recording/reproducing digital signals in the LS2 mode is given by the equation (1) like the height difference Hb in the head arrangement shown in each of FIGS. 18 and 20. Since the difference φ b in distribution angle is 45°, the height difference Hb becomes Tp/8. A height difference Hc between the magnetic heads 3a and 4a and between the magnetic heads 3b and 4b used for recording/reproducing digital signals in the HS mode is similarly given by the equation (2). Since the difference φ c in distribution angle is 90°, the height difference Hc becomes 0.

With the above head arrangement and height differences, like the head arrangement and height differences shown in each of FIGS. 19 and 20, it is possible to record/reproduce digital signals for both the track pitch Tp=29 μm shown in Table 2 and the track pitch Tp=19 μm shown in Table 3 in all the modes excluding the LS2 mode only by the single head arrangement.

Figure 23:
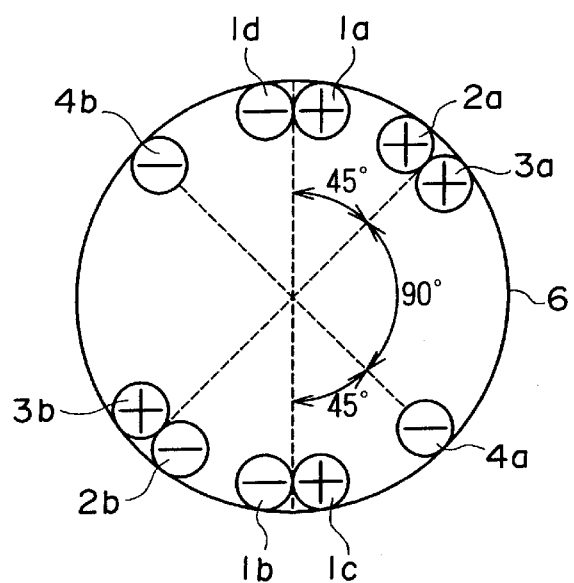
FIG. 23 is a diagram showing a further example of the head arrangement.

FIG. 23 is a diagram showing a further head arrangement which is changed from that shown in FIG. 17 in that the magnetic heads 2a and 2b are disposed in proximity to the magnetic heads 3a and 3b (φ b≈0°) and the magnetic heads 3a and 3b are spaced from the magnetic heads 4a and 4b by 90°(φ c=90°). The combination of the magnetic heads for recording/reproducing digital signals in each mode is the same as that shown in each of FIGS. 17, 19 and 21.

Figure 24:
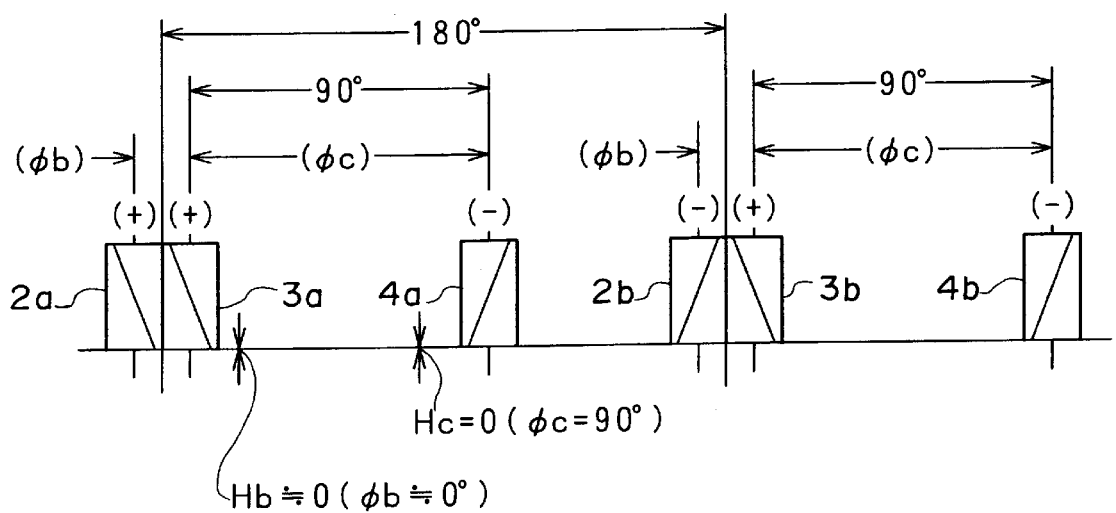
FIG. 24 is a diagram showing each difference in height between heads arranged in accordance with the head arrangement shown in FIG. 23.

FIG. 24 is a diagram showing each difference in height between the heads arranged in accordance with the head arrangement shown in FIG. 23. A height difference Hb between the magnetic heads 2b and 3b used for recording/reproducing digital signals in the LS2 mode is given by the equation (1). Since the difference φ b in distribution angle is about 0°, the height difference Hb becomes about 0. A height difference Hc between the magnetic heads 3a and 4a and between the magnetic heads 3b and 4b used for recording/reproducing digital signals in the HS mode is given by the equation (2). Since the difference φ c in distribution angle is 90°, the height difference Hc becomes 0.

With the above head arrangement and height differences, it is possible to record/reproduce digital signals for both the track pitch Tp=29 μm shown in Table 2 and the track pitch Tp=19 μm shown in Table 3 in all the modes including the LS2 mode only by the single head arrangement. To be more specific, since all the magnetic heads 2a, 2b, 3a, 3b, 4a and 4b in the above head arrangement are mounted at the same height, the head arrangement can be applied to any track pitch.

Since the magnetic heads 2a and 2b and the magnetic heads 3a and 3b are disposed in proximity to each other but are mounted at the same height, they can be easily, uniformly brought into contact with the magnetic tape.

Figure 25:
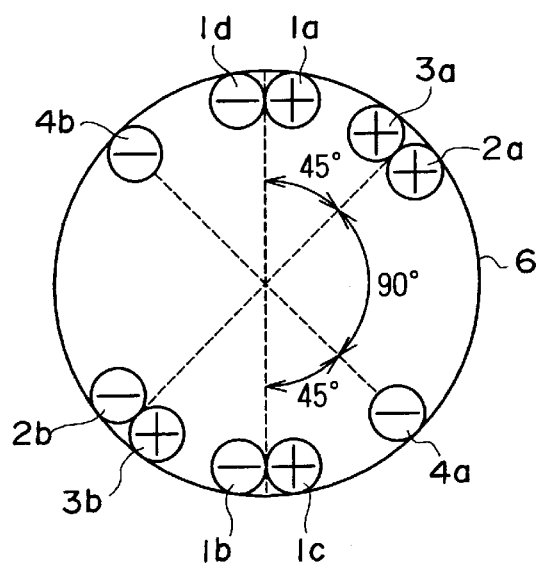
FIG. 25 is a diagram showing a further example of the head arrangement.

FIG. 25 is a diagram showing a further head arrangement which is changed from that shown in FIG. 23 in that the magnetic heads 2a and 2b are replaced with the magnetic heads 3a and 3b. The combination of the magnetic heads for recording/reproducing digital signals in each mode is the same as that shown in each of FIGS. 17, 19, 21 and 23.

Figure 26:
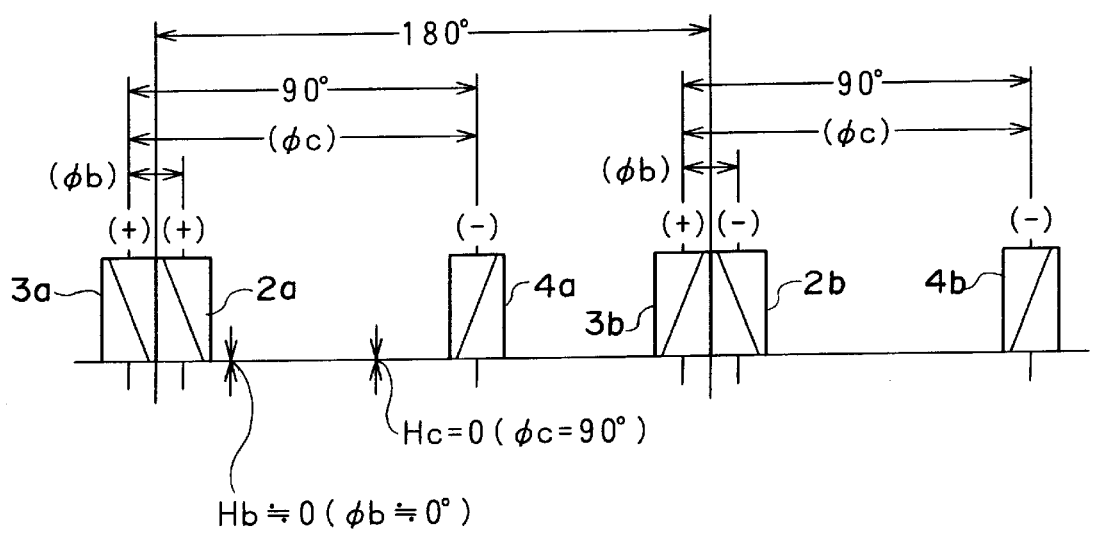
FIG. 26 is a diagram showing each difference in height between heads arranged in accordance with the head arrangement shown in FIG. 25.

FIG. 26 is a diagram showing each difference in height between the heads arranged in accordance with the head arrangement shown in FIG. 25. A height difference Hb between the magnetic heads 2b and 3b used for recording/reproducing digital signals in the LS2 mode is given by the equation (1) like the height difference Hb in the head arrangement shown in FIG. 24. Since the difference φ b in distribution angle is about 0°, the height difference Hb becomes about 0. A height difference Hc between the magnetic heads 3a and 4a and between the magnetic heads 3b and 4b used for recording/reproducing digital signals in the HS mode is similarly given by the equation (2). Since the difference φ c in distribution angle is 90°, the height difference Hc becomes 0.

With the above head arrangement and height differences, like the head arrangement and height differences shown in FIGS. 23 and 24, it is possible to record/reproduce digital signals for both the track pitch Tp=29 μm shown in Table 2 and the track pitch Tp=19 μm shown in Table 3 in all the modes including the LS2 mode only by the single head arrangement. To be more specific, since all the magnetic heads 2a, 2b, 3a, 3b, 4a and 4b in the above head arrangement are mounted at the same height, the head arrangement can be applied to any track pitch.

Incidentally, since an analog audio signal is recorded in a deep portion of a magnetic layer, the magnetic head used for recording such an analog audio signal requires a characteristic suitable therefor, for example, a relatively large gap length. On the other hand, the magnetic head used for recording/reproducing digital signals having a short wavelength is required to have a small gap length. Accordingly, the magnetic head used for recording/reproducing not only digital signals but also analog audio signals is required to record an analog audio signal in the deep portion of the magnetic layer and to record a digital signal having a short wavelength. For this reason, an expensive metal head is required to be used as the above magnetic head. Such a metal head, however, has a problem in that the performance thereof is degraded under a low-moisture service condition.

Figure 27:
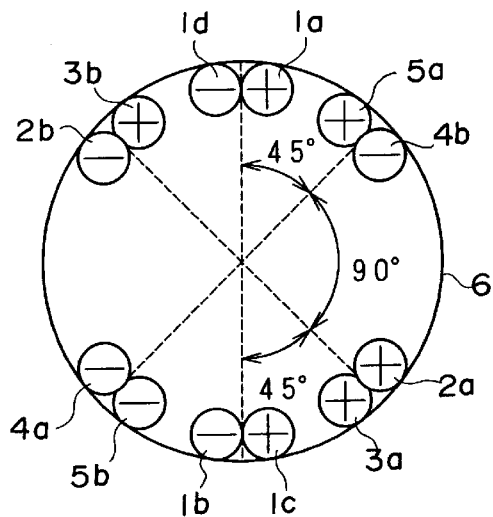
FIG. 27 is a diagram showing a further example of the head arrangement.

FIG. 27 is a diagram showing an example of a head arrangement which is able to solve the above problem. In this head arrangement, the head arrangement shown in FIG. 23 is changed such that the magnetic heads 2a, 2b, 3a, 3b, 4a and 4b are turned by 90° and analog audio signal recording/reproducing magnetic heads 5a and 5b are additionally disposed in proximity to the magnetic heads 4b and 4a, respectively. The combination of the magnetic heads for recording/reproducing digital signals in each mode is the same as that shown in FIG. 23.

In this way, by using the magnetic heads 2a and 2b only for recording/reproducing digital signals and additionally providing the analog audio signal recording/reproducing magnetic heads 5a and 5b, an advantage can be obtained in that the magnetic heads can be independently, optimally designed in accordance with signals to be recorded/reproduced and inexpensive ferrite heads can be used as the magnetic heads. To be more specific, a ferrite head having a large gap length, which has been used for the conventional analog VTR, is used as each of the analog audio signal recording/reproducing magnetic heads 5a and 5b, and a ferrite head having a small gap length can be used as each of the digital signal recording/reproducing magnetic heads 2a and 2b. Further, the ferrite head does not cause, unlike the metal head, the problem that the performance thereof is degraded under a low-moisture service condition and exhibits an effect of improving the reliability of the apparatus.

Even in the head arrangement shown in each of FIGS. 17, 19, 21 and 23 in which the magnetic heads 2a and 2b are used for recording/reproducing not only digital signals but also analog audio signals, the ferrite head having a small gap length can be used as each of the magnetic heads 3a, 3b, 4a and 4b used for recording/reproducing digital signals in the HS mode.

Figure 28:
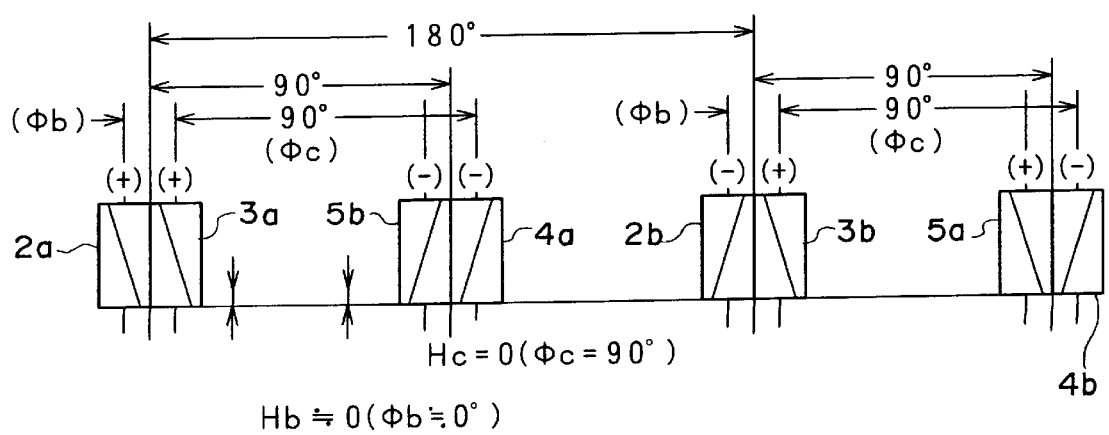
FIG. 28 is a diagram showing each difference in height between heads arranged in accordance with the head arrangement shown in FIG. 27.

FIG. 28 is a diagram showing each difference in height between the heads arranged in accordance with the head arrangement shown in FIG. 27. A height difference Hb between the magnetic heads 2b and 3b used for recording/reproducing digital signals in the LS2 mode is given by the equation (1) like the height difference Hb in the head arrangement shown in FIG. 24. Since the difference φ b in distribution angle is about 0°, the height difference Hb becomes about 0. A height difference Hc between the magnetic heads 3a and 4a and between the magnetic heads 3b and 4b used for recording/reproducing digital signals in the HS mode is given by the equation (2). Since the difference φ c in distribution angle is 90°, the height difference Hc becomes 0.

With the above head arrangement and height differences, like the head arrangement and height differences shown in each of FIGS. 23 and 24 and FIGS. 25 and 26, it is possible to record/reproduce digital signals for both the track pitch Tp=29 μm shown in Table 2 and the track pitch Tp=19 μm shown in Table 3 in all the modes including the LS2 mode only by the single head arrangement.

The height difference for the analog audio signal recording/reproducing magnetic heads 1a, 1b, 1c and 1d and the analog audio signal recording/reproducing magnetic heads 5a and 5b is set on the basis of the standard of the conventional analog VTR. The height difference between the analog audio signal recording/reproducing magnetic heads 5a and 5b and the digital signal recording/reproducing magnetic heads 2a and 2b is not particularly limited, and in this head arrangement, the above magnetic heads are mounted at the same height. With this configuration, since all the magnetic heads including the analog audio signal recording/reproducing magnetic heads 5a and 5b are mounted at the same height, they can be easily, uniformly brought in contact with the magnetic tape.

Figure 29:
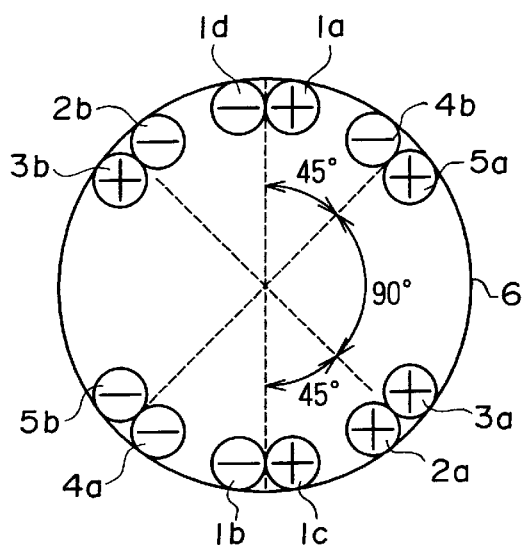
FIG. 29 is a diagram showing a further example of the head arrangement.

FIG. 29 is a diagram showing a further example of a head arrangement which is changed from that shown in FIG. 27 in that the positions of the magnetic heads 2a and 2b are replaced with those of the magnetic heads 3a and 3b and the positions of the magnetic heads 5a and 5b are replaced with those of the magnetic heads 4b and 4a. The difference φ c in distribution angle between the magnetic heads 3a and 4a and between the magnetic heads 3b and 4b used for recording/reproducing digital signals in the HS mode is set to 90° like the head arrangement shown in FIG. 27. The combination of the magnetic heads used for recording/reproducing digital signals in any one of the other modes is the same as that shown in FIG. 27.

Figure 30:
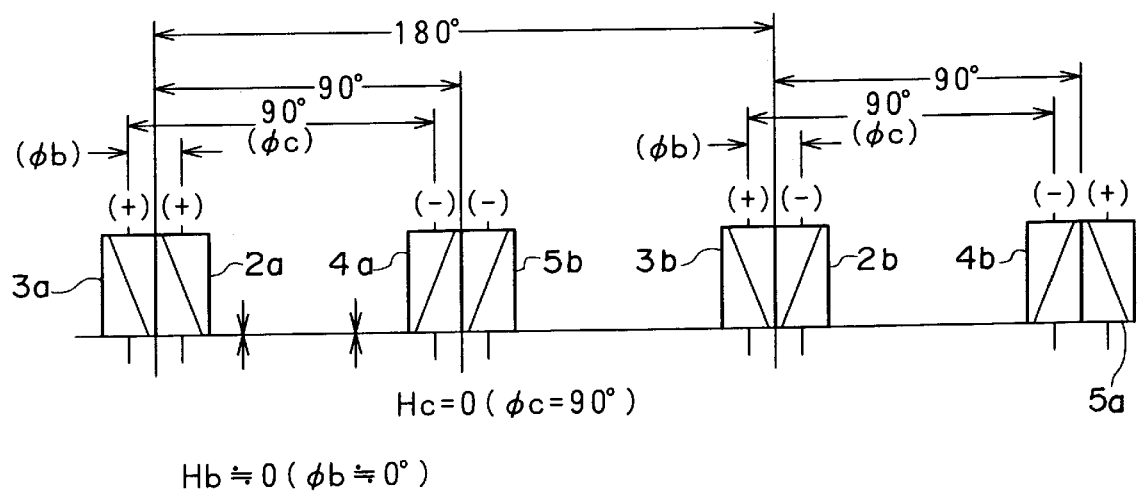
FIG. 30 is a diagram showing a difference in height between heads arranged in accordance with the head arrangement shown in FIG. 29.

FIG. 30 is a diagram showing each difference in height between the heads arranged in accordance with the head arrangement shown in FIG. 29. A height difference Hb between the magnetic heads 2b and 3b used for recording/reproducing digital signals in the LS2 mode is given by the equation (1) like the height difference Hb in the head arrangement shown in FIG. 28. Since the difference φ b in distribution angle is about 0°, the height difference Hb becomes about 0. A height difference Hc between the magnetic heads 3a and 4a and between the magnetic heads 3b and 4b used for recording/reproducing digital signals in the HS mode is given by the equation (2). Since the difference φ c in distribution angle is 90°, the height difference Hc becomes 0.

With the above head arrangement and height differences, like the head arrangement and height differences shown in each of FIGS. 23 and 24, FIGS. 25 and 26, and FIGS. 27 and 28, it is possible to record/reproduce digital signals for both the track pitch Tp=29 μm shown in Table 2 and the track pitch Tp=19 μm shown in Table 3 in all the modes including the LS2 mode only by the single head arrangement.

Figure 38:
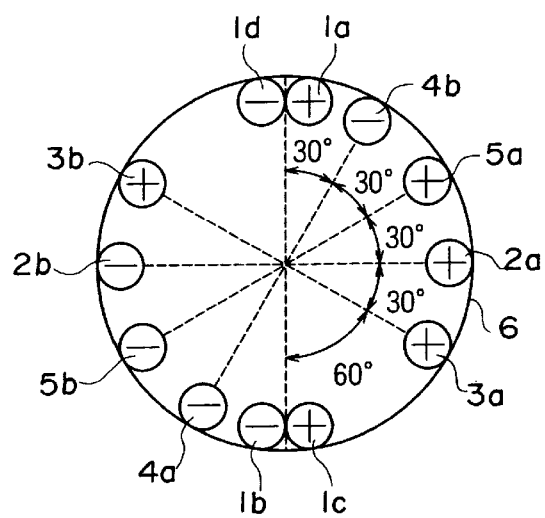
FIG. 38 is a diagram showing a further example of the head arrangement.

FIG. 38 is a diagram showing a further example of a head arrangement. The magnetic heads 5a and 5b are provided only for recording/reproducing analog audio signals in the same way shown in FIGS. 27 and 29. The magnetic heads 2a, 2b, 3a, 3b, 4a, 4b for recording/reproducing digital signals are arranged at intervals of 30° together with the heads 5a and 5b. The difference φ b in distribution angle between the magnetic heads 2b and 3b used in the LS2 mode is set to 30° and the difference φ c in distribution angle between the magnetic heads 3a and 4a and between the magnetic heads 3b and 4b used in the HS mode is set to 90°.

Figure 39:
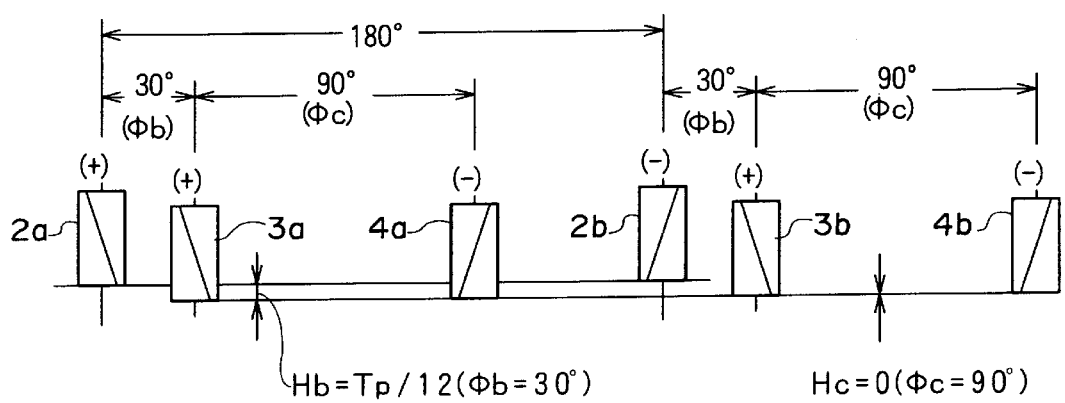
FIG. 39 is a diagram showing a difference in height between heads arranged in accordance with the head arrangement shown in FIG. 38.

FIG. 39 is a diagram showing each difference in height between the heads arranged in accordance with the head arrangement shown in FIG. 38. A height difference Hb between the magnetic heads 2b and 3b used in LS2 mode becomes Tp/12 since φ b=30° in the equation (1). A height difference Hc between the magnetic heads 3a and 4a and between the magnetic heads 3b and 4b used in HS mode becomes 0 since φ c=90° in the equation (2).

With the above head arrangement and height differences, like the head arrangement and height differences shown in each of FIGS. 19 and 20, FIGS. 21 and 22, it is possible to record/reproduce digital signals for both the track pitch Tp=29 μm shown in Table 2 and the track pitch Tp=19 μm shown in Table 3 in all the modes excluding the LS2 mode only by the single head arrangement. Since all magnetic heads used for recording/reproducing digital signals are separately arranged like the head arrangement shown in each of FIGS. 17, 19 and 21, they can be configured as single magnetic heads not required to be subjected to complicated works, and the manufacturing cost can be reduced. Since the magnetic heads can be easily, uniformly brought into contact with the magnetic tape, the reliability of the apparatus can be improved.

Incidentally, digital signals to be recorded by using the above-described apparatus include a video signal and an audio signal which are subjected to digital compression coding, for example, by an MPEG (Moving Picture Experts Group) method. In the case of recording a video signal and an audio signal subjected to digital compression coding, video data for trick playing-back are recorded along the scanning locus of heads upon trick playing-back, in addition to the above signals, and the video data are reproduced upon trick playing-back. In this case, according to the present invention, video data for trick playing-back which have been recorded in the standard (STD) mode or the long-time (LS2, LS3 or the like) mode are reproduced by using the magnetic heads 2a and 2b having plus/minus (±) azimuth angles and are opposed to each other by 180°. Video data for trick playing-back which have been recorded in the high rate (HS) mode are reproduced upon special reproducing in the forward direction by using the magnetic heads 3a and 3b having plus (+) azimuth angles and opposed to each other by 180°, and are reproduced upon trick playing-back in the reversed direction by using the magnetic heads 4a and 4b having minus (−) azimuth angles and opposed to each other by 180°. This can be applied not only to the above-described head arrangement but also any head arrangement. Accordingly, it is possible to attain compatibility between apparatuses having different head configurations.

Figure 31:
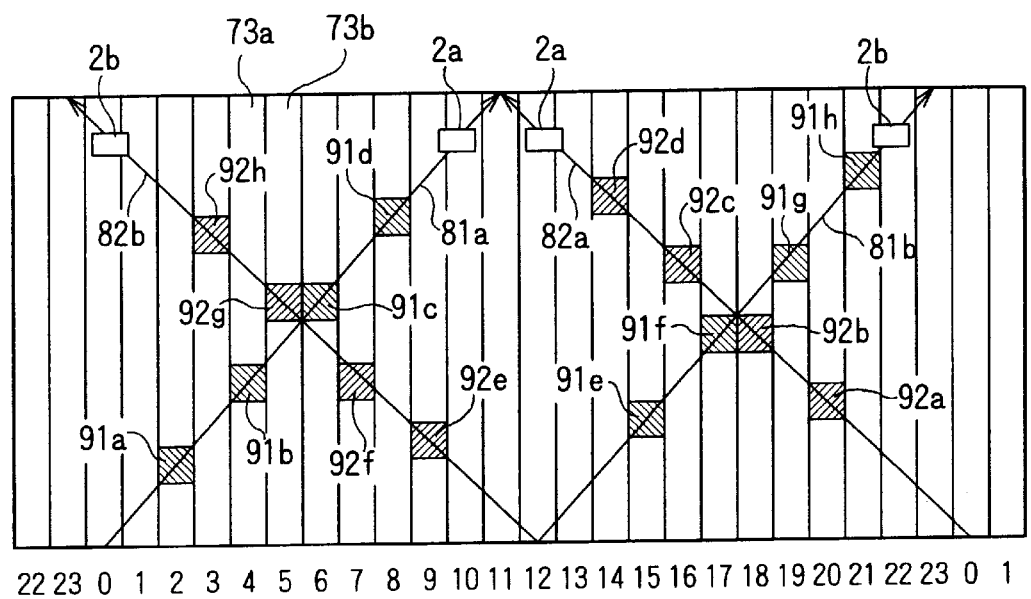
FIG. 31 is a diagram showing one example of a relationship between data, used for trick playing-back, recorded on the magnetic tape and traces of magnetic heads.

FIG. 31 is a diagram showing a relationship between data for trick playing-back on the magnetic tape in the STD mode and traces of the magnetic heads. In the example shown in FIG. 31, the reproducing speed is ±12 times as fast as the usual reproducing speed. In this figure, reference characters 81a and 81b designate scanning loci of the magnetic heads 2a and 2b in the forward (+) direction upon trick playing-back, and 82a and 82b are scanning loci of the magnetic heads 2a and 2b in the reverse (−) direction upon trick playing-back. Reference characters 91a, 91b, 91c, 91d, 91e, 91f, 91g and 91h are data for trick playing-back in the forward (+) direction, and 92a, 92b, 92c, 92d, 92e, 92f, 92g and 92h are data for trick playing-back in the reverse (−) direction. In this way, in the STD mode, since the data for trick playing-back are arranged along the scanning loci by using the magnetic heads 2a and 2b having plus/minus (±) azimuth angles and which are opposed to each other by 180°, the configuration in this example can be applied to an apparatus having any head arrangement.

Figure 32:
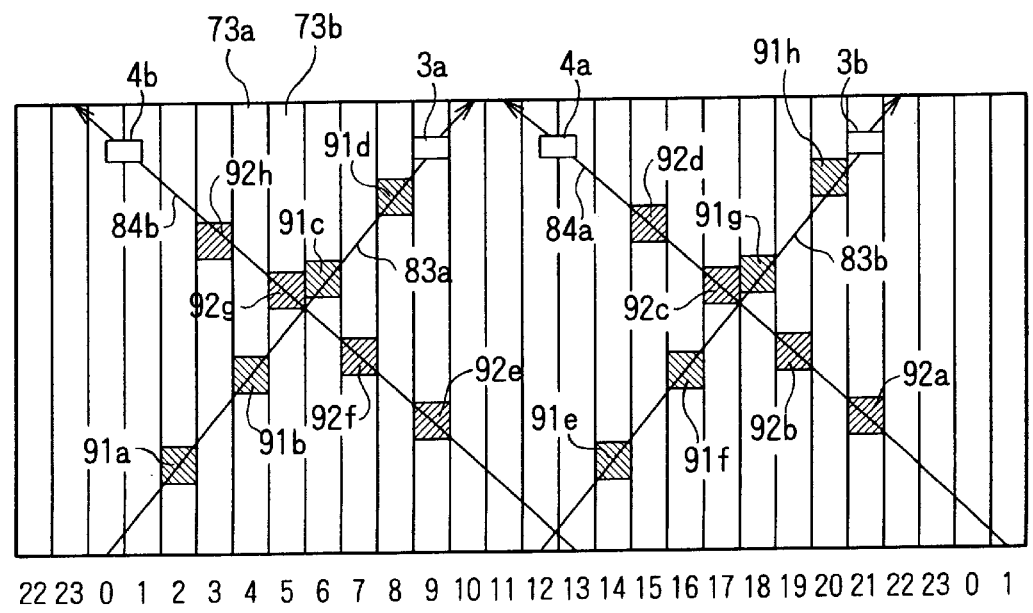
FIG. 32 is a diagram showing another example of the relationship between data, used for trick playing-back, recorded on the magnetic tape and traces of magnetic heads.

FIG. 32 is a diagram showing a relationship between data for trick playing-back on the magnetic tape in the HS mode and traces of the magnetic heads. In the example shown in FIG. 32, the reproducing speed is ±6 times as fast as the usual reproducing speed. In this figure, reference characters 83a and 83b designate scanning loci of the magnetic heads 3a and 3b used for trick playing-back in the forward (+) direction, and 84a and 84b designate scanning loci of the magnetic heads 4a and 4b used for trick playing-back in the reverse (−) direction. In this way, in the HS mode, the magnetic heads 3a and 3b having plus (+) azimuth angles and which are opposed to each other by 180° are used for trick playing-back in the forward (+) direction and the magnetic heads 4a and 4b having minus (−) azimuth angles and which are opposed to each other by 180° are used for trick playing-back in the reverse (−) direction, and data for trick playing-back are arranged along the scanning loci of the magnetic heads, the configuration in this example can be applied to an apparatus having any head arrangement.

Figure 33:
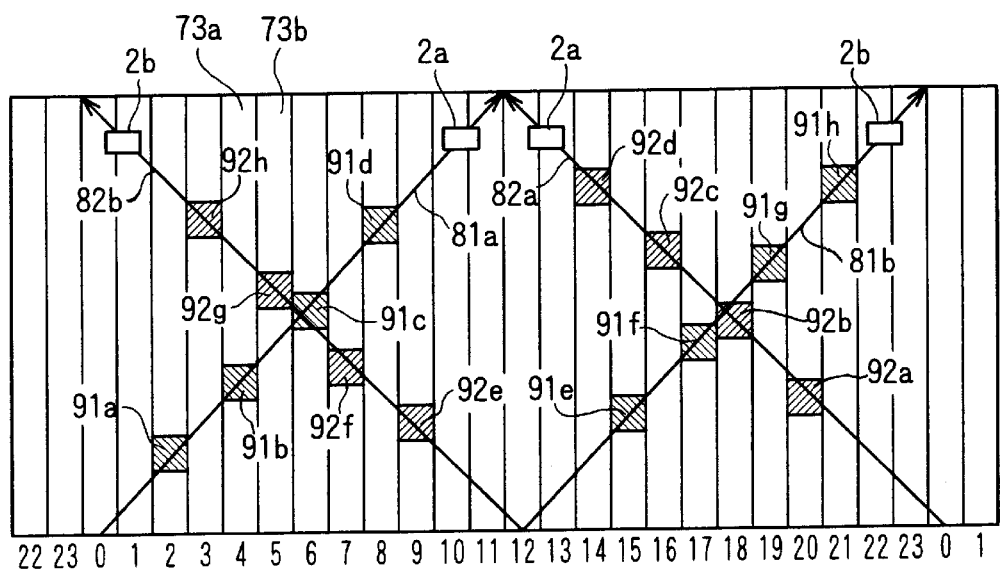
FIG. 33 is a diagram showing a further example of the relationship between data, used for trick playing-back, recorded on the magnetic tape and traces of magnetic heads.

FIG. 33 is a diagram showing a relationship between data for trick playing-back on the magnetic tape in the LS2 mode and traces of the magnetic heads. In the example shown in FIG. 33, the reproducing speed is ±24 times as fast as the usual reproducing speed. In the LS2 mode, not using the magnetic heads 2b and 3b used for usual recording/reproducing, like the STD mode, since the magnetic heads 2a and 2b having plus/minus (±) azimuth angles and which are opposed to each other by 180° are used and data for trick playing-back are arranged along scanning loci of the magnetic heads, the configuration in this example can be applied to an apparatus having any head arrangement.

Figure 34:
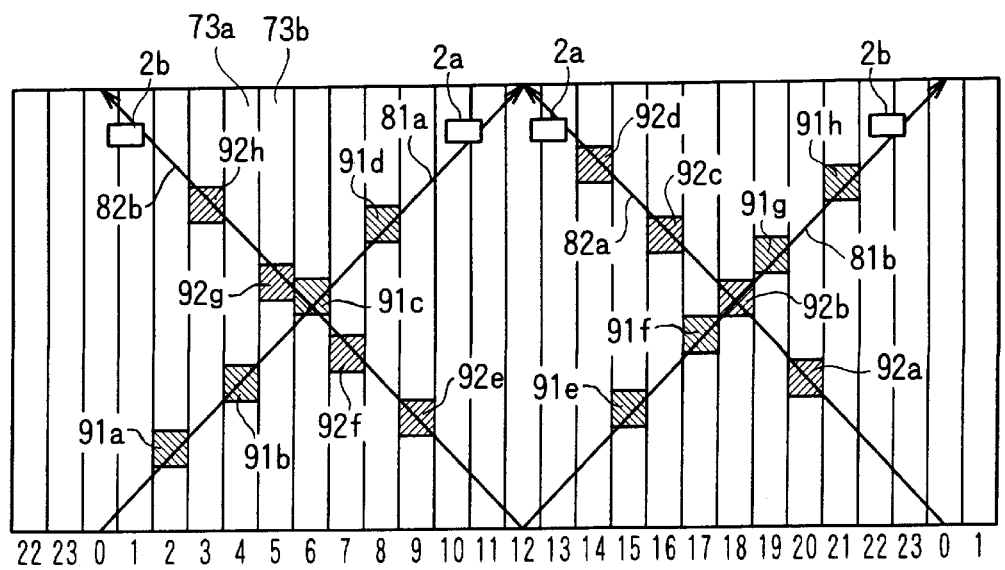
FIG. 34 is a diagram showing a further example of the relationship between data, used for trick playing-back, recorded on the magnetic tape and traces of magnetic heads.

FIG. 34 is a diagram showing a relationship between data for trick playing-back on the magnetic tape in the LS3 mode and traces of the magnetic heads. In the example shown in FIG. 34, the reproducing speed is ±36 times as fast as the usual reproducing speed. Even in the LS3 mode, like the STD mode, since the magnetic heads 2a and 2b having plus/minus (±) azimuth angles and which are opposed to each other by 180° are used and data for trick playing-back are arranged along scanning loci of the magnetic heads, the configuration in this example can be applied to an apparatus having any head arrangement.

In the above examples, the tape speed upon trick playing-back is kept constant irrespective of the mode.

Figure 35:
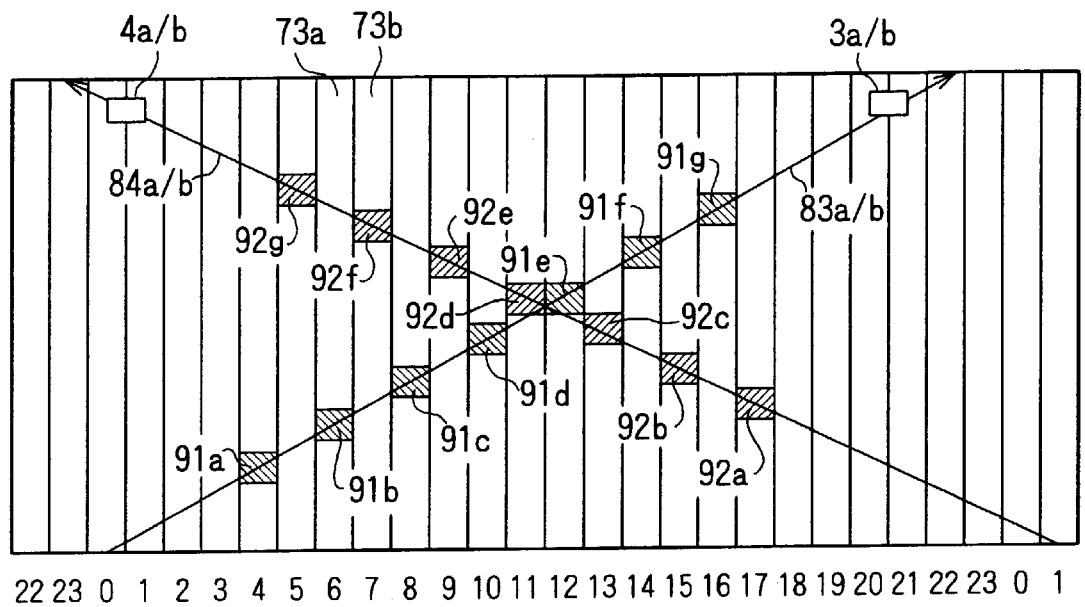
FIG. 35 is a diagram showing a further example of the relationship between data, used for trick playing-back, recorded on the magnetic tape and traces of magnetic heads.

FIG. 35 is a diagram showing a relationship between data for trick playing-back on the magnetic tape in the HS mode and traces of the magnetic heads. In the example shown in FIG. 35, the reproducing speed is ±12 times as fast as the usual reproducing speed. In the figure, reference character 83a/b designates scanning loci of the magnetic heads 3a and 3b used for trick playing-back in the forward (+) direction, and 84a/b is scanning loci of the magnetic heads 4a and 4b used for trick playing-back in the reverse (−) direction.

Figure 36:
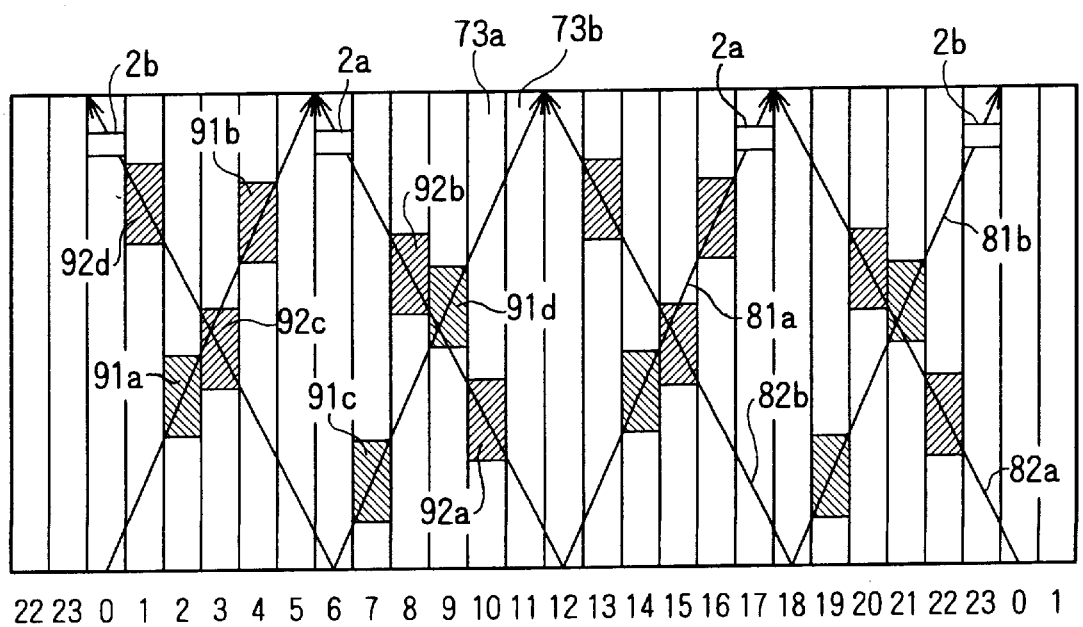
FIG. 36 is a diagram showing a further example of the relationship between data, used for trick playing-back, recorded on the magnetic tape and traces of magnetic heads.

FIG. 36 is a diagram showing a relationship between data for trick playing-back on the magnetic tape in the LS2 mode and traces of the magnetic heads. In the example shown in FIG. 36, the reproducing speed is ±12 times as fast as the usual reproducing speed.

FIG. 37 is a diagram showing a relationship between data for trick playing-back on the magnetic tape in the LS3 mode and traces of the magnetic heads. In the example shown in FIG. 37, the reproducing speed is ±12 times as fast as the usual reproducing speed.

In the above examples, the magnification of the tape speed upon trick playing-back is kept constant irrespective of the mode.

In this way, by reproducing the video data for trick playing-back recorded in each of the STD, LS2, LS3 modes and the like using the magnetic heads 2a and 2b, and reproducing the video data for trick playing-back recorded in the HS mode using the magnetic heads 3a and 3b or the magnetic heads 4a and 4b, the configuration in the above examples can be applied to an apparatus having any head configuration. Accordingly, it is possible to attain compatibility between apparatuses having different head configurations.

According to the present invention, it is possible to form an ideal recording pattern even with any head arrangement, and hence to attain compatibility between the apparatuses having different head configurations.

Since the magnetic heads used in each mode are separately arranged, they can be configured as single magnetic heads not required to be subjected to complicated works, and since the magnetic heads can be easily, uniformly brought into contact with the magnetic tape, the manufacturing cost can be reduced and the reliability of the apparatus can be improved.

Since all the magnetic heads used in each mode are mounted at the same height, it is possible to record/reproduce digital signals for a plurality of track pitches, for example, 29 μm and 19 μm only by the single head arrangement.

In the case where the digital signal recording/reproducing magnetic heads and the analog audio signal recording/reproducing magnetic heads are provided separately from each other, it is possible to solve the problem that the performance is degraded under a low-moisture service condition and hence to improve the reliability of the apparatus.

Further, by using pairs of the magnetic heads opposed to each other by 180° on the rotating drum in the case of reproducing video data for trick playing-back, it is possible to attain compatibility between apparatuses having different head configurations.

The invention may be embodied in other specific forms without departing from the spirit or essential characteristics thereof. The present embodiment is therefore to be considered in all respects as illustrative and not restricted, the scope of the invention being indicated by the appended claims rather than by the foregoing description and all changes which come within the meaning and range of equivalency of the claims are therefore intended to be embraced.

What is claimed is:

1. A magnetic recording and/or reproducing apparatus operating in a plurality of modes matched to transmission rates to record and/or reproduce digital signals on/from a magnetic tape driven by a tape drive, said apparatus comprising:

a first magnetic head having a first azimuth angle and being disposed at a first position on a rotary drum;

a second magnetic head having a second azimuth angle opposed in polarity to said first azimuth angle and being disposed at a second position opposed to said first position by 180°;

a third magnetic head having said first azimuth angle and being disposed at a third position on said rotary drum;

a fourth magnetic head having said first azimuth angle and being disposed at a fourth position opposed to said third position by 180°;

a fifth magnetic head having said second azimuth angle and being disposed at a fifth position on said rotary drum;

a sixth magnetic head having said second azimuth angle and being disposed at a sixth position opposed to said fifth position by 180°; and a circuit for controlling said tape drive in a first mode to drive said magnetic tape at a first traveling speed for recording and/or reproducing said digital signal on two tracks per one revolution of said rotary drum using said first and second magnetic heads, for controlling said tape drive in a second mode to drive said magnetic tape at a second traveling speed which is twice as fast as said first traveling speed for recording and/or reproducing said digital signal on four tracks per one revolution of said rotary drum using said third, fourth, fifth and sixth magnetic heads, and for controlling said tape drive in a third mode to drive said magnetic tape at a third traveling speed which is one-half said first traveling speed for recording and/or reproducing said digital signal on two tracks for two revolutions of said rotary drum using said second and fourth magnetic heads.

2. A magnetic recording and/or reproducing apparatus according to claim 1, wherein said circuit is used to control said tape drive in a fourth mode to drive said magnetic tape at a fourth traveling speed which is 1/N (N: odd number being 3 or more) said first traveling speed, and record and/or reproduce said digital signal on two tracks per N-revolutions of said rotary drum using said first and second magnetic heads.

3. A magnetic recording and/or reproducing apparatus according to claim 1, wherein said first and second magnetic heads, said third and fourth magnetic heads, and said fifth and sixth magnetic heads are mounted at the same height, respectively;

said second and fourth magnetic heads are mounted at a height difference Hb given by $$Hb=(Tp/2)\times(\phi b/180°)$$

where ø b is a difference in mounting angles between said second and fourth magnetic heads and Tp is a track pitch; and said third and fourth magnetic heads are mounted at a height difference Hc given by $$Hc=Tp-(2\times Tp)\times(\phi c/180°)$$

where ø c is a difference in mounting angles between said third and fourth magnetic heads.

4. A magnetic recording and/or reproducing apparatus according to claim 3, further comprising:

a seventh magnetic head having a third azimuth angle and being disposed at a seventh position on said rotary drum; and an eighth magnetic head having a fourth azimuth angle opposed in polarity to said third azimuth angle and being disposed at an eighth position opposed to said seventh position by 180°, wherein said circuit is used to control said tape drive in a fifth mode to drive said magnetic tape at a fifth traveling speed, and record and/or reproduce an analog video signal using said seventh and eighth magnetic heads.

5. A magnetic recording and/or reproducing apparatus according to claim 4, further comprising:

a ninth magnetic head having said fourth azimuth angle and being disposed at a ninth position which is in proximity to said seventh position; and a tenth magnetic head having said third azimuth angle and being disposed at a tenth position which is in proximity to said eighth position and opposed to said ninth position by 180°;

wherein said circuit is used to control said tape drive in a sixth mode to drive said magnetic tape at a sixth traveling speed which is one-third said fifth traveling speed, and record and/or reproduce said analog video signal using said ninth and tenth magnetic heads.

6. A magnetic recording and/or reproducing apparatus according to claim 4, wherein said circuit is used control said tape drive to record and/or reproduce, in said fifth or sixth mode, an analog audio signal by using said first and second magnetic heads.

7. A magnetic recording and/or reproducing apparatus according to claim 4, wherein said first, third, fifth and seventh positions are substantially spaced from each other at intervals of 45°.

8. A magnetic recording and/or reproducing apparatus according to claim 7, wherein said first position is substantially ahead of said third position by 45° and is also substantially ahead of said eighth position by 135°; and said third position is substantially ahead of said fifth position by 45°.

9. A magnetic recording and/or reproducing apparatus according to claim 7, wherein said first position is substantially ahead of said eighth position by 90°; and said third position is substantially ahead of said first position by 45° and is substantially ahead of said fifth position by 90°.

10. A magnetic recording and/or reproducing apparatus according to claim 7, wherein said first position is substantially ahead of said third position by 45° and is substantially ahead of said eighth position by 90°; and said third position is substantially ahead of said fifth position by 90°.

11. A magnetic recording and/or reproducing apparatus according to claim 6, wherein said first position is in proximity to said third position and is substantially ahead of said eighth or tenth position by 135°; and said third position is substantially ahead of said fifth position by 90°.

12. A magnetic recording and/or reproducing apparatus according to claim 4, further comprising:

an eleventh magnetic head having said first azimuth angle and being disposed at an eleventh position which is in proximity to said sixth position; and a twelfth magnetic head having said second azimuth angle and being disposed at a twelfth position which is in proximity to said fifth position and opposed said eleventh position by 180°;

wherein said first position is in proximity to said third position and is substantially ahead of said eighth or tenth position by 45°;

said third position is substantially ahead of said fifth position by 90°;

said eleventh position is substantially ahead of said eighth or tenth position by 135°; and said circuit is used to control said tape drive to record and/or reproduce, in said fifth or sixth mode, an analog audio signal using said eleventh and twelfth magnetic heads.

13. A magnetic recording and/or reproducing apparatus according to claim 9, wherein said circuit is used to control said tape drive in a seventh mode to drive said magnetic tape at a seventh traveling speed and record and/or reproduce said digital signal on two tracks per one revolution of said rotary drum using said first and second magnetic heads; and said circuit also is used to control said tape drive in an eighth mode to drive said magnetic tape at an eighth traveling speed which is twice as fast as said seventh traveling speed and record and/or reproduce said digital signal on four tracks per one revolution of said rotary drum using said third, fourth, fifth and sixth magnetic heads.

14. A magnetic recording and/or reproducing apparatus according to claim 10, wherein said circuit is used to control said tape drive in a seventh mode to drive said magnetic tape at a seventh traveling speed and record and/or reproduce said digital signal on two tracks per one revolution of said rotary drum using said first and second magnetic heads; and said circuit also is used to control said tape drive in an eighth mode to drive said magnetic tape at an eighth traveling speed which is twice as fast as said seventh traveling speed and record and/or reproduce said digital signal on four tracks per one revolution of said rotary drum using said third, fourth, fifth and sixth magnetic heads.

15. A magnetic recording and/or reproducing apparatus according to claim 11, wherein said circuit is used to control said tape drive in a seventh mode to drive said magnetic tape at a seventh traveling speed and record and/or reproduce said digital signal on two tracks per one revolution of said rotary drum using said first and second magnetic heads; and said circuit also is used to control said tape drive in an eighth mode to drive said magnetic tape at an eighth traveling speed which is twice as fast as said seventh traveling speed and record and/or reproduce said digital signal on four tracks per one revolution of said rotary drum using said third, fourth, fifth and sixth magnetic heads.

16. A magnetic recording and/or reproducing apparatus according to claim 12, wherein said circuit is used to control said tape drive in a seventh mode to drive said magnetic tape at a seventh traveling speed and record and/or reproduce said digital signal on two tracks per one revolution of said rotary drum using said first and second magnetic heads; and said circuit also is used to control said tape drive in an eighth mode to drive said magnetic tape at an eighth traveling speed which is twice as fast as said seventh traveling speed and record and/or reproduce said digital signal on four tracks per one revolution of said rotary drum using said third, fourth, fifth and sixth magnetic heads.

17. A magnetic recording and/or reproducing apparatus according to claim 13, wherein said circuit is used to control said tape drive in a ninth mode to drive said magnetic tape at a ninth traveling speed being one-half said seventh traveling speed and record and/or reproduce said digital signal on two tracks per two revolutions of said rotary drum using said second and fourth magnetic heads.

18. A magnetic recording and/or reproducing apparatus according to claim 14, wherein said circuit is used to control said tape drive in a ninth mode, said magnetic tape at a ninth traveling speed being one-half said seventh traveling speed and record and/or reproduce said digital signal on two tracks per two revolutions of said rotary drum by using said second and fourth magnetic heads.

19. A magnetic recording and/or reproducing apparatus according to claim 15, wherein said circuit is used to control said tape drive in a ninth mode to drive said magnetic tape at a ninth traveling speed which is one-half said seventh traveling speed and record and/or reproduce said digital signal on two tracks per two revolutions of said rotary drum using said second and fourth magnetic heads.

20. A magnetic recording and/or reproducing apparatus according to claim 16, wherein said circuit is used to control said tape drive in a ninth mode to drive said magnetic tape at a ninth traveling speed which is one-half said seventh traveling speed and record and/or reproduce said digital signal on two tracks per two revolutions of said rotary drum using said second and fourth magnetic heads.

21. A magnetic recording and/or reproducing apparatus according to claim 17, wherein said circuit is used to control said tape drive in a tenth mode to drive said magnetic tape at a tenth traveling speed which is 1/N (N: odd number being 3 or more) said seventh traveling speed and record and/or reproduce said digital signal on two tracks per N-revolutions of said rotary drum using said first and second magnetic heads.

22. A magnetic recording and/or reproducing apparatus according to claim 18, wherein said circuit is used to control said tape drive in a tenth mode to drive said magnetic tape at a tenth traveling speed which is 1/N (N: odd number being 3 or more) said seventh traveling speed and record and/or reproduce said digital signal on two tracks per N-revolutions of said rotary drum using said first and second magnetic heads.

23. A magnetic recording and/or reproducing apparatus according to claim 19, wherein said circuit is used to control said tape drive in a tenth mode to drive said magnetic tape at a tenth traveling speed which is 1/N (N: odd number being 3 or more) said seventh traveling speed and record and/or reproduce said digital signal on two tracks per N-revolutions of said rotary drum using said first and second magnetic heads.

24. A magnetic recording and/or reproducing apparatus according to claim 20, wherein said circuit is used to control said tape drive in a tenth mode to drive said magnetic tape at a tenth traveling speed which is 1/N (N: odd number being 3 or more) said seventh traveling speed and record and/or reproduce said digital signal on two tracks per N-revolutions of said rotary drum using said first and second magnetic heads.

25. A magnetic recording and/or reproducing apparatus according to claim 3, wherein said circuit is used to control said tape drive in an eleventh mode to drive said magnetic tape at an eleventh traveling speed which is K times (K: integer) as fast as said first traveling speed and reproduce part of said digital signal recorded in said first mode using said first and second magnetic heads;

said circuit also is used to control said tape drive in a twelfth mode to drive said magnetic tape at a twelfth traveling speed which is K times as fast as said second traveling speed and reproduce part of said digital signal recorded in said second mode by using said third and fourth magnetic heads or said fifth and sixth magnetic heads; and said circuit further is used to control said tape drive in a thirteenth mode to drive said magnetic tape at a thirteenth traveling speed which is K times as fast as said third traveling speed and reproduce part of said digital signal recorded in said third mode using said first and second magnetic heads.

26. A magnetic recording and/or reproducing apparatus according to claim 25, wherein said circuit further is used to control said tape drive in a fourteenth mode to drive said magnetic tape at a fourteenth traveling speed which is k times as fast as said fourth traveling speed and reproduce part of said digital signal recorded in said fourth mode using said first and second magnetic heads.

* * * * *